United States Patent [19]

Takashima

[11] Patent Number: 5,754,233
[45] Date of Patent: May 19, 1998

[54] COMPRESSION ENCODING APPARATUS AND RECORDING APPARATUS FOR COMPRESSION ENCODED DATA

[75] Inventor: Masatoshi Takashima, Tokyo, Japan

[73] Assignee: Sony Corporation, Tokyo, Japan

[21] Appl. No.: 697,797

[22] Filed: Aug. 30, 1996

[30] Foreign Application Priority Data

Sep. 4, 1995 [JP] Japan .................... 7-226459

[51] Int. Cl.[6] ........................................... H04N 7/12
[52] U.S. Cl. .................... 348/390; 348/423; 348/700; 386/111
[58] Field of Search ............................... 348/402, 400, 348/401, 407, 405, 409–413, 415, 416, 699, 700, 701, 390, 384; 382/232, 236, 238; 386/46, 52, 53, 66, 68–71, 82, 109–112, 125; H04N 7/032, 7/12

[56] References Cited

U.S. PATENT DOCUMENTS

| | | | |
|---|---|---|---|
| 5,227,878 | 7/1993 | Puri et al. | 348/416 |
| 5,231,484 | 7/1993 | Gonzales et al. | 348/405 |
| 5,267,334 | 11/1993 | Normille et al. | 348/401 |
| 5,504,530 | 4/1996 | Obikane et al. | 348/413 |
| 5,561,465 | 10/1996 | Fautier et al. | 348/415 |
| 5,565,920 | 10/1996 | Lee et al. | 348/398 |
| 5,574,504 | 11/1996 | Yagasaki et al. | 348/415 |
| 5,589,884 | 12/1996 | Ohguchi | 348/405 |
| 5,619,424 | 4/1997 | Cookson et al. | 348/18 |
| 5,621,464 | 4/1997 | Teo et al. | 348/390 |

FOREIGN PATENT DOCUMENTS 3-66272  3/1991  Japan .................. H04N 5/92

Primary Examiner—Tommy P. Chin
Assistant Examiner—Y. Lee
Attorney, Agent, or Firm—William S. Frommer; Alvin Sinderbrand

[57] ABSTRACT

In an encoding apparatus having a memory of diminished size for lowering the production cost, the memory stores input video signals made up of plural pictures including intra-pictures (I-pictures) and a scene change detector 101 detects change points of the input video signals. An encoding unit 106 encodes pictures stored in the memory 102 by fixed length encoding for generating a bitstream. A timing control unit 105 determines successive groups of pictures, each including at least an intra-picture, on the basis of the detection by the scene change detector 101, and controls the processing timing of fixed length encoding of each picture in the group of pictures by the encoding unit 106. A rate control unit 107 sets a range from a picture next to an intra-picture to the next intra-picture as a range of the code generation rate in the encoding unit 106. The rate control unit 107 controls the range of the code generation rate so that, if a scene change has been detected, the amount of the encoding information previously allocated to the intra-picture will be allocated to other pictures.

18 Claims, 17 Drawing Sheets

COMPRESSION ENCODING APPARATUS AND RECORDING APPARATUS FOR COMPRESSIONENCODED DATA

BACKGROUND OF THE INVENTION

This invention relates to a compression encoding apparatus for high efficiency encoding of a moving picture by exploiting correlation along the time axis, and to an apparatus for recording compression encoded data representing video signals.

DESCRIPTION OF THE RELATED ART

A high-efficiency encoding system is known as the Motion Picture Image coding Experts Group (MPEG) system. With the MPEG system, inter-picture prediction is performed for curtailing redundancy along the time axis. To this end, the MPEG system provides for three picture types, namely an Intra-picture or I-picture, a predictive coded picture or P-picture and a bi-directionally coded picture or B-picture. The I-picture is an intra-coded picture, that is a picture encoded within a frame itself, while the P-picture is a picture encoded by forward prediction and the B-picture is a picture encoded by bi-directional prediction.

The MPEG system also uses a group-of-pictures or GOP structure for enabling random accessing. That is, random accessing can be carried out with a set of plural pictures as a unit.

As shown in FIG. 1, with picture data encoded in accordance with the MPEG system, those beginning from an I-picture I(3) and ending at a picture prior to the next I-picture I(12) in the encoding sequence are grouped as one GOP. The reason is that, with the pictures grouped in this manner, picture reproduction may be realized when performing variable speed reproduction by decoding the I-picture which does not exploit inter-frame correlation, and the I-picture may be easily isolated by detecting the GOP header specifying the GOP entry point provided in each GOP.

Although the size and the construction of one GOP may be selected freely, the usual practice is to keep the size of one GOP constant at all times and to fix the number and construction of I-pictures, P-pictures and B-pictures in one GOP.

However, with the fixed construction of one GOP, if a picture where a scene change has occurred is a P-picture or a B-picture, the picture cannot be coded smoothly, and the picture quality of the GOP containing such picture is deteriorated.

Thus, with a proposed compression encoding apparatus employing the above-mentioned MPEG system, as shown in FIG. 2, the following processing is performed.

First, input video signals are supplied to a scene change detection circuit 501 for detecting scene changes in the input video signals. Simultaneously, the input video signals are stored in a frame memory 502. In the proposed apparatus, the number of pictures in each GOP is set to 9 pictures for usual operations. Thus the frame memory 502 has a storage capacity of two GOPs, that is 18 pictures. At a point in time when 18 pictures of the input video signals are stored in the frame memory 502, any scene change that occurred in the 18 pictures is detected by the scene change detection circuit 501. Before the pictures held in the frame memory 502 are supplied to an encoding circuit 506, a timing control circuit 505 determines the construction of one GOP based on the detection output of the scene change detection circuit 501.

It is now assumed that the state in which a picture sequence from a B-picture B(1) to a P-picture P(18) are stored in the memory 502 is termed buffer status 1, the state in which a picture sequence from a B-picture B(10) to an I-picture I(27) are stored in the memory 502 is termed a buffer status 2, and the state in which a picture sequence from a B-picture B(19) to a P-picture P(36) are stored in the memory 502 is termed a buffer status 3, as shown in FIG. 3. These states are such that, with the fixed construction of one GOP, the boundary between one GOP and the next GOP is a GOP point, and 18 pictures from one GOP point to the second GOP point are stored in the frame memory 502. If, with buffer status 1, a scene change is detected by the scene change detection circuit 501 at the 15th picture, that is, at the I-picture I(15) on FIG. 3, the timing control circuit 505 sets one GOP as being comprised of the first picture B(1) to the twelfth picture I(12) in the display or picture sequence. If, with buffer status 2, a scene change is detected by the scene change detection circuit 501 at the 25th picture, that is at the B-picture B(25), the timing control circuit 505 sets one GOP as being comprised of the 13th picture B(13) to the 24th picture P(24) in the display sequence. If, with buffer status 3, a new scene change has not been detected by the scene change circuit 501, the timing control circuit 501 sets one GOP as being comprised of pictures from the previous scene change point up to the next GOP point, that is, as being comprised of the 25th picture B(25) up to the 27th picture I(24) in the display sequence.

As described above, the timing control circuit 505 sets the size and construction of one GOP variably within a range of 2 GOPs, and routes the corresponding timing control signals, such as those containing processing mode flags as later explained and picture type information, to a motion vector detection or motion estimator (ME) circuit 503, an encoding circuit 506 and a rate control circuit 507.

The ME circuit 503, encoding processing circuit 506 and rate control circuit 507 perform processing operations based on a timing control signal from the timing control circuit 505.

The bit rate controlling operation of the circuit 507 will now be explained with reference to the flow chart of FIG. 4. In general, the bit rate control circuit 507 includes a suitably programmed micro-computer (not shown). When such micro-computer is started, parameters are first initialized at step $S17_1$ to enter an interrupt awaiting state (step $S17_2$). If an interrupt is applied, the above-mentioned processing mode flag and the picture type information are seized at steps $S17_3$, $S17_4$ in order to judge the nature of the interrupt. In response to this processing mode flag, a decision is given at step $S17_5$, step $S17_6$ and step $S17_7$ whether the interrupt is GOP-based, picture-based or macro-block-based, respectively. Based on the results of such decision, the GOP-based processing (step $S17_8$), picture-based processing (step $S17_{10}$) or the macro-block-based processing (step $S17_{11}$) is performed.

If, at step $S17_8$, the interrupt is judged to be the GOP-based interrupt, the numbers of the I-, P- and B-pictures of the GOP currently processed, that is, the current GOP, are seized at step $S17_{81}$, and the amount of residual bits or the amount of the encoding information remaining which is allocated to the current GOP is calculated at step $S17_{82}$. A transmission buffer (not shown) is initialized from one picture type to another in step $S17_{83}$.

With the above-described compression encoding apparatus 100 of the background art, since the size and the construction of one GOP are changed within a range of 2

GOPs in response to the results of scene change detection, the required capacity of the frame memory 502 is 2 GOPs, that is 18 pictures. Because of the extremely large capacity of the frame memory 502, the production cost is prohibitively increased.

In addition, since bit rate control for the encoding circuit S06 is performed by the timing control signal from the timing control signal 505 based on a GOP, as determined by the timing control circuit 505, the total bit rate needs to be calculated each time the size of the GOP determined by the timing control circuit 505 is changed. In other words, since the amount of the residual bits from those allocated to the current GOP needs to be calculated each time the size of one GOP is changed, as shown in FIG. 4, the bit rate control operation becomes complex.

On the other hand, if the bitstream obtained by the compression encoding apparatus of the background art is recorded on a recording medium, the bitstream is lacking in the point information specifying a range of constant code generating bits, so that it has not been possible to do accurate writing or re-writing for a pre-set range of the recording medium by a re-writing system configured for doing overwriting on the recording medium.

SUMMARY OF THE INVENTION

It is therefore an object of the present invention to provide a compression encoding apparatus and an apparatus for recording compression-encoded data and by which production costs may be lowered by significantly reducing the size or capacity of the required memory.

It is another object of the present invention to provide a compression encoding apparatus and an apparatus for recording compression-encoded data and by which the encoding operation for the compression is simplified.

It is a further object of the present invention to provide a compression encoding apparatus by which compression encoded data can be correctly written and re-written in a pre-set range at a pre-set position on a recording medium.

It is yet another object of the present invention to provide a recording apparatus for encoded data by which encoded data can be correctly written and re-written in a pre-set range at a pre-set position on a recording medium.

In accordance with one aspect of the present invention, an encoding apparatus for encoding video signals made up of a plurality of pictures in accordance with an encoding system exploiting inter-frame prediction includes storage means for storing input video signals, change point detection means for detecting change points of the pictures of the input video signals, encoding means for encoding the pictures stored in the storage means with a fixed encoding length as an encoding unit for generating a bitstream, timing control means for determining a group of pictures inclusive of at least an intra-picture based on the results of detection of the change point detection means and for controlling the processing timing of the fixed length encoding of each picture in the group of pictures by the encoding means, and rate control means for controlling the range of the code generation rate in the encoding means based on the results of detection by the change point detection means under control of the timing control means. In the foregoing, the rate control means sets a range for the code generation rate which ranges from a picture next to an intra-picture to the next intra-picture. If a scene change has occurred, the residual of the amount of the encoding information previously allocated to the intra-picture is allocated to another picture. If a change point, such as a scene change, is detected in the intra-picture, the picture where the change point has occurred is switched to an intra-picture to do fixed-length coding, so that data recorded on the recording medium may be reproduced without deterioration in picture quality, and hence an optimum reproduced picture is obtained. Since it is only necessary for the storage means to have a storage capacity of at least three pictures, the memory size may be reduced significantly as compared to that with the conventional apparatus, thus lowering the production cost of the apparatus.

In accordance with another aspect of the present invention, an apparatus for encoding video signals made up of a plurality of pictures in accordance with an encoding system exploiting inter-frame prediction and for recording the encoded data in a recording medium includes storage means for storing input video signals, change point detection means for detecting change points of the pictures of the input video signals, encoding means for encoding the pictures stored in the storage means in a fixed length as an encoding unit for generating a bitstream, timing control means for determining a group of pictures inclusive of at least an intra-picture based on the results of detection of the change point detection means and for controlling the processing timing of the fixed length encoding of each picture in the group of pictures by the encoding means, rate control means for controlling the range of the code generation rate in the encoding means based on the results of detection by the change point detection means under control of the timing control means, and recording means for recording a bitstream obtained by the encoding means on a recording medium. The rate control means sets a range of from a picture next to an intra-picture to the next intra-picture as a range of code generation rate. If a scene change has occurred, the residual of the amount of the encoding information previously allocated to the intra-picture is allocated to another picture. If a change point, such as a scene change, is detected in the intra-picture, the picture where the change point has occurred is switched to an intra-picture to do fixed-length coding, so that data recorded on the recording medium may be reproduced without deterioration in picture quality, and hence an optimum reproduced picture is obtained. Since it is only necessary for the storage means to have a storage capacity of at least three pictures, the memory size may be reduced significantly as compared to that with the conventional recording apparatus, thus lowering the production cost of the apparatus.

With the encoding apparatus according to the present invention, the rate control means fixes the number of pictures in a range of a code generation rate and a start picture. This enables correct fixed length encoding. For recording on a recording medium the encoded data obtained with the encoding apparatus, the encoded data can be reliably written or re-written in a pre-set range of the recording medium. Since the range of the encoding generation rate is fixed, it is unnecessary to calculate the desired encoding length, thus simplifying the encoding process.

With the encoding apparatus according to the present invention, the rate control unit doubles the code generation rate on detection of a scene change. If a change point, such as a scene change, occurs in input video signals, the amount of the encoding information previously allocated to the intra-picture may be reliably allocated to another picture.

With the encoding apparatus according to the present invention, the encoding means inserts the information specifying the range of the code generation rate into the bitstream under control of the rate control means. In this manner, when recording the encoded data obtained with the encoding apparatus, the encoded data can be written and re-written more reliably in a pre-set range of the recording medium.

With the encoding apparatus according to the present invention, the result of detection by the change point detection means is overridden until the other picture is fixed-length encoded by the encoding means. In this manner, fixed length encoding may be maintained within the range of the code generation rate even if a scene change has occurred.

With the encoding apparatus according to the present invention, the change point detection means detects a change point of the input video signals by the residual information found at the time of motion vector detection in the inter-frame prediction. This enables correct detection of a change point in the input video signals.

DESCRIPTION OF THE PREFERRED EMBODIMENTS

Figure 5:
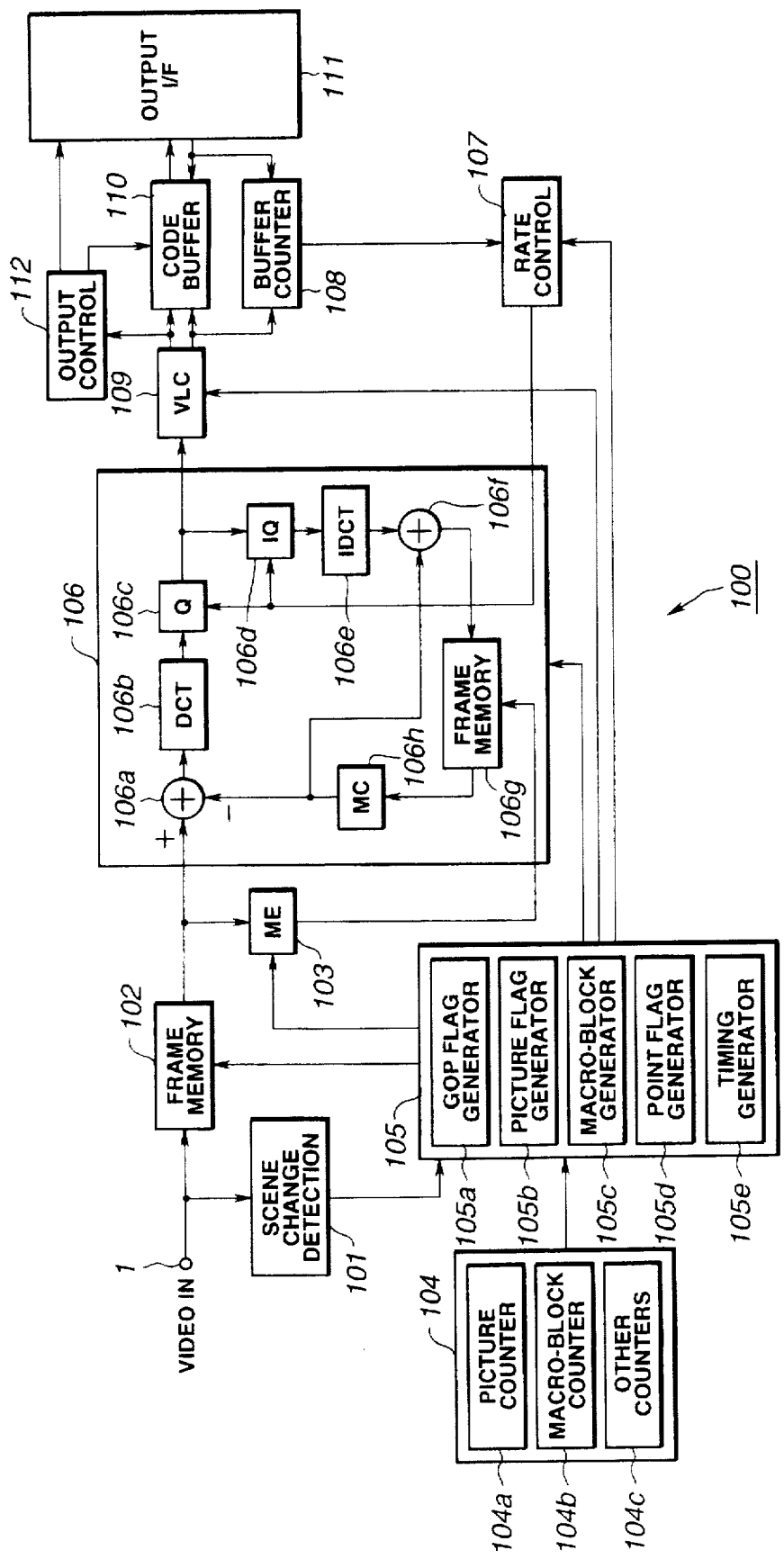
FIG. 5 is a block diagram showing the construction of a compression encoding apparatus according to an embodiment of the present invention.

An encoding apparatus 100 according to an embodiment of the present invention is shown in FIG. 5 to include a scene change detection circuit 101 and a frame memory 102, both fed with input video signals through an input terminal 1. The encoding apparatus 100 also includes a counter 104 and a timing control circuit 105 fed with outputs of the counter 104 and the scene change detection circuit 101. The encoding apparatus 100 further includes a motion vector detection or motion estimator (ME) circuit 103 fed with outputs of the frame memory 102 and the timing control circuit 105, and a rate control circuit 107 fed with an output of the timing control circuit 105. In the encoding apparatus 100, an encoding processing circuit 106 is fed with outputs of the frame memory 102, ME circuit 103, timing control circuit 105 and rate control circuit 107, and a variable length encoding (VLC) circuit 109 is fed with outputs of the timing control circuit 105 and the encoding processing circuit 106. Moreover, in the encoding apparatus 100, an output control circuit 112 is fed with an output of the VLC circuit 109, and a code buffer 110 is fed with outputs of the VLC circuit 109 and the output control circuit 112. The encoding apparatus 100 additionally includes an output interfacing (I/F) circuit 111 fed with outputs of the output control circuit 112 and the code buffer 110, and a buffer counter 108 fed with outputs of the VLC circuit 109 and the output I/F circuit 111.

The output of the timing control circuit 105 is also fed to the frame memory 102, and the code buffer 110 also receives outputs of the output I/F circuit 111 and the VLC circuit 109, while the rate control circuit 107 is fed with an output of the code buffer 110.

Figure 6:
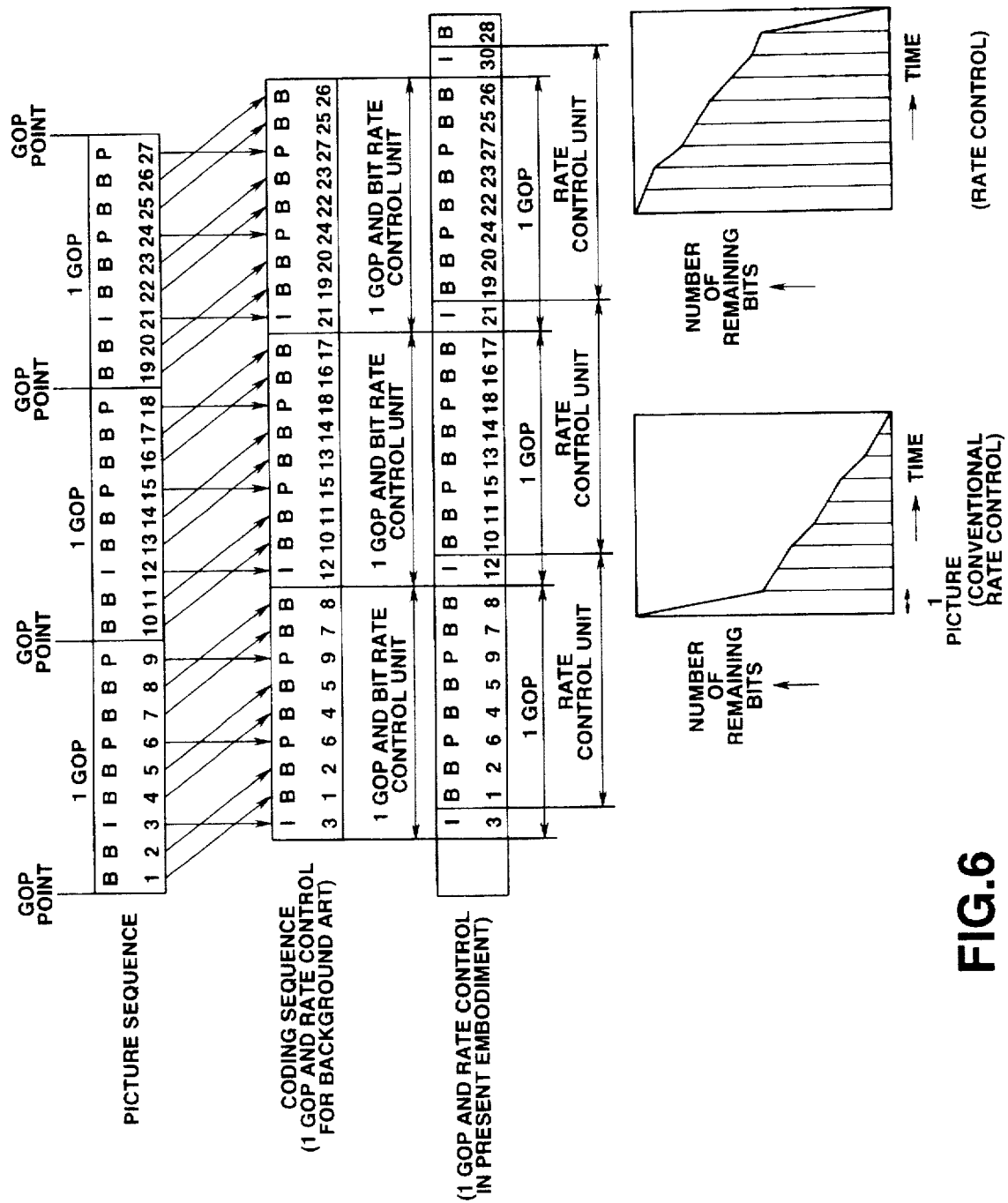
FIG. 6 illustrates the configuration for one GOP and bit rate control with the encoding apparatus of the background art as contrasted with that according to the present invention.

The above-described encoding apparatus 100 exploits the MPEG system, and handles picture data comprised of intra-frame coded pictures (I-pictures), forward predictive coded pictures (P-pictures) and bi-directional predictive coded pictures or B-pictures. The original picture data enter the encoding apparatus 100 shown in FIG. 5 as video signals in the picture sequence of B(1), B(2), I(3), B(4), B(5), P(6), . . . . . as shown in FIG. 6. Thus, if the number of pictures making up a GOP of the input video signals is set to 9, the GOP is comprised of B(1) to P(9).

In encoding the pictures, entered in the foregoing picture sequence, encoding is performed on respective pictures interchanged in their positions in terms of a GOP as a unit in accordance with the rule of the GOP structure. In other words, as shown in FIG. 6, encoding is performed in an encoding sequence of I(3), B(1), B(2), P(6), B(4), B(5), . . . which is different from the picture sequence.

A series of operations performed in the encoding apparatus 100 will now be explained.

The video signals supplied to the encoding apparatus 100 are fed to the scene change detection circuit 101 and to the frame memory 102.

Since the original picture data handled by the encoding apparatus 100 has two B-pictures between the I-picture and the P-picture, as shown in FIG. 6, the frame memory 102 has a storage capacity of three pictures. Consequently, the input video signals are stored in the frame memory 102 with three pictures being taken as the units thereof.

The scene change detection circuit 101 detects any picture in the input video signals where a scene change has occurred, and supplies the results of such detection to the timing control circuit 105.

The counter 104 is shown on FIG. 5 to be made up of a picture counter 104a, a macro-block counter 104b and a counter 104c for performing various other counting operations. The counter 104 detects horizontal synchronization signals and vertical synchronization signals in the input video signal and counts the clocks in a macro-block, the number of macro-blocks in the picture and the number of pictures in the GOP in a timed relation to these synchronization signals. The count values of the counter 104 are supplied to the timing control circuit 105.

The timing control circuit 105 is shown on FIG. 5 to include a GOP flag generator 105a, a picture flag generator 105b, a macro-block generator 105c, a point flag generator 105d for setting a fixed length and a timing generator 105e for generating a variety of timing signals. The timing control circuit 105 sets the positions of I-, P- and B-pictures and the GOP points based on various count values from the counter 104 and on the results of detection by the scene change detection circuit 101. Thus, the timing control circuit 105 generates timing control signals for the positions of the I-, P- and B-pictures and the GOP points, as well as processing mode flags as later explained and the picture type information, by the above generators 105a to 105e, and transmits the generated data to the frame memory 102, ME circuit 103, encoding circuit 106, VLC circuit 109 and rate control circuit 107. The processing for determining the positions of the I-, P- and B-pictures and the GOP points by the timing control circuit 105 will be subsequently explained in detail.

The pictures stored in the frame memory 102 are read out by the timing control signal supplied to the latter from the timing control circuit 105 in a coding sequence in which the pictures in a GOP are arrayed differently from the original picture sequence. The pictures read out from the frame memory 102 are supplied to the ME circuit 103 and to the encoding processing circuit 106.

The ME circuit 103 causes read out of a previous picture stored in a frame memory 106g of the encoding processing circuit 106 as later explained, as a search frame, based on the timing control signal from the timing control circuit 105, and detects, on the basis of a motion vector, which block in that previous picture is matched by each block of a picture from the frame memory 102. The ME circuit 103 routes the detected motion vector to the encoding processing circuit 106.

The encoding processing circuit 106 further includes a subtraction circuit 106a fed, at one input, with pictures from the frame memory 102, and an orthogonal transform circuit 106b which, in the illustrated encoding apparatus 100, is a discrete cosine transform (DCT) circuit. The encoding processing circuit 106 also includes a quantization circuit 106c fed with an output of the DCT circuit 106b, and an inverse quantization circuit 106d fed with an output of the quantization circuit 106c. Further, in the encoding processing circuit 106, an inverse DCT circuit 106e is fed with an output of the inverse quantization circuit 106d, and an addition circuit 106f receives, at one of its inputs, an output of the inverse DCT circuit 106e. The frame memory 106g is fed with an output of the addition circuit 106f and a motion compensation prediction or motion compensator (MC) circuit 106h receives the output of frame memory 106g. The output of the motion compensator circuit 106h is supplied to a second input of the subtraction circuit 106a and also to a second input of the addition circuit 106f.

An output of the ME circuit 103, that is, the abovementioned motion vector information, is supplied to the frame memory 106g, while an output of the rate control circuit 107 is fed to both the quantization circuit 106c and the inverse quantization circuit 106d, and an output of the quantization circuit 106c is fed to the VLC circuit 109.

Each processing by the encoding processing circuit 106 which will now be explained is controlled on the basis of timing control signals from the timing control circuit 105.

Using motion vector information stored in the frame memory 106g, the MC circuit 106h reads out the previous picture stored in the frame memory 106g to perform motion compensation thereon. The MC circuit 106h routes the motion-compensated previous picture to the subtraction circuit 106a, while storing the picture in the frame memory 106g.

The subtraction circuit 106a finds the difference between the picture from the frame memory 102 and the previous picture motion-compensated by the MC circuit 106h, and routes the resulting difference data to the DCT circuit 106b.

The DCT circuit 106b performs two-dimensional DCT on the difference data from the subtraction circuit 106a and routes the resulting DCT coefficients to the quantization circuit 106c.

The quantization circuit 106c quantizes the DCT coefficients from the DCT circuit 106b at an arbitrary quantization step Q, under control of the rate control circuit 107, and routes the resulting quantized DCT coefficients to both the VLC circuit 109 and the inverse quantization circuit 106d.

The inverse quantization circuit 106d inverse quantizes the quantized data from the quantization circuit 106c at the quantization step Q employed by the quantization circuit 106c, under control of the rate control circuit 107, for restoring the DCT coefficients, which are then supplied to the inverse DCT circuit 106e.

The inverse DCT circuit 106e performs inverse DCT on the DCT coefficients from the inverse quantization circuit 106d for restoring the DCT coefficients from the inverse quantization circuit 106d to data on the spatial axis, that is, to the difference data obtained by the subtraction circuit 106a, and routes the resulting difference data to the addition circuit 106f. The addition circuit 106f adds the motion-compensated previous picture obtained from the MC circuit 106h to the difference data from the inverse DCT circuit 106e for restoring the current picture which is then stored, as a previous picture, in the frame memory 106g.

The data thus reduced in redundancy in both the time axis and the frequency axis by the ME circuit 103 and the encoding processing circuit 106 are outputted from the encoding processing circuit 106 to the VLC circuit 109. The VLC circuit 109 allocates variable length codes to the data from the encoding processing circuit 106, on the basis of the respective timing control signal from the timing control circuit 105, and stores the generated bitstream in the code buffer 110.

The code buffer 110 outputs the bitstream from the VLC circuit 109 via the output interfacing circuit 111 under the control of the output control circuit 112.

At this time, the buffer counter 108 counts the number of times data is written in the code buffer 110 by the VLC circuit 109 for detecting the number of bits of the actually generated encoded data. The buffer counter 108 also counts the number of times data is read from the code buffer 110 to the output interfacing circuit 111 for detecting the take-up or storage ratio of the code buffer 110. The buffer counter 108 routes the detected bit number information and the detected buffer storage ratio information to the rate control circuit 107.

The rate control circuit 107 controls the quantization circuit 106c and the inverse quantization circuit 106d of the encoding processing circuit 106, on the basis of the detected bit number information and the buffer storage ratio information from the buffer counter 108, so that the amount of the generated data will be maintained lower than the number of bits of the desired fixed length and so that overflow from the code buffer 110 is avoided.

The processing by the timing control circuit 105 and the output control circuit 112 for determining the positions of the I-, P- and B-pictures and the GOP point will now be explained.

Figure 1:
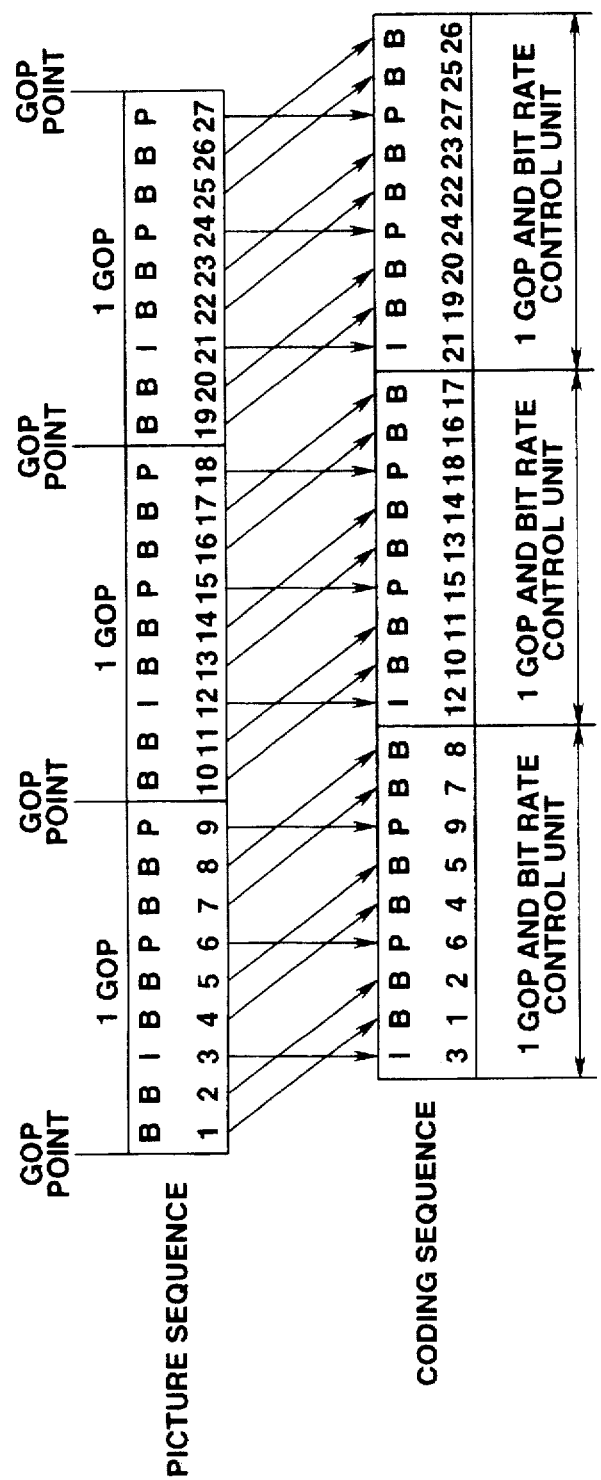
FIG. 1 illustrates a range for one GOP and bit rate control in accordance with the background art.
Figure 2:
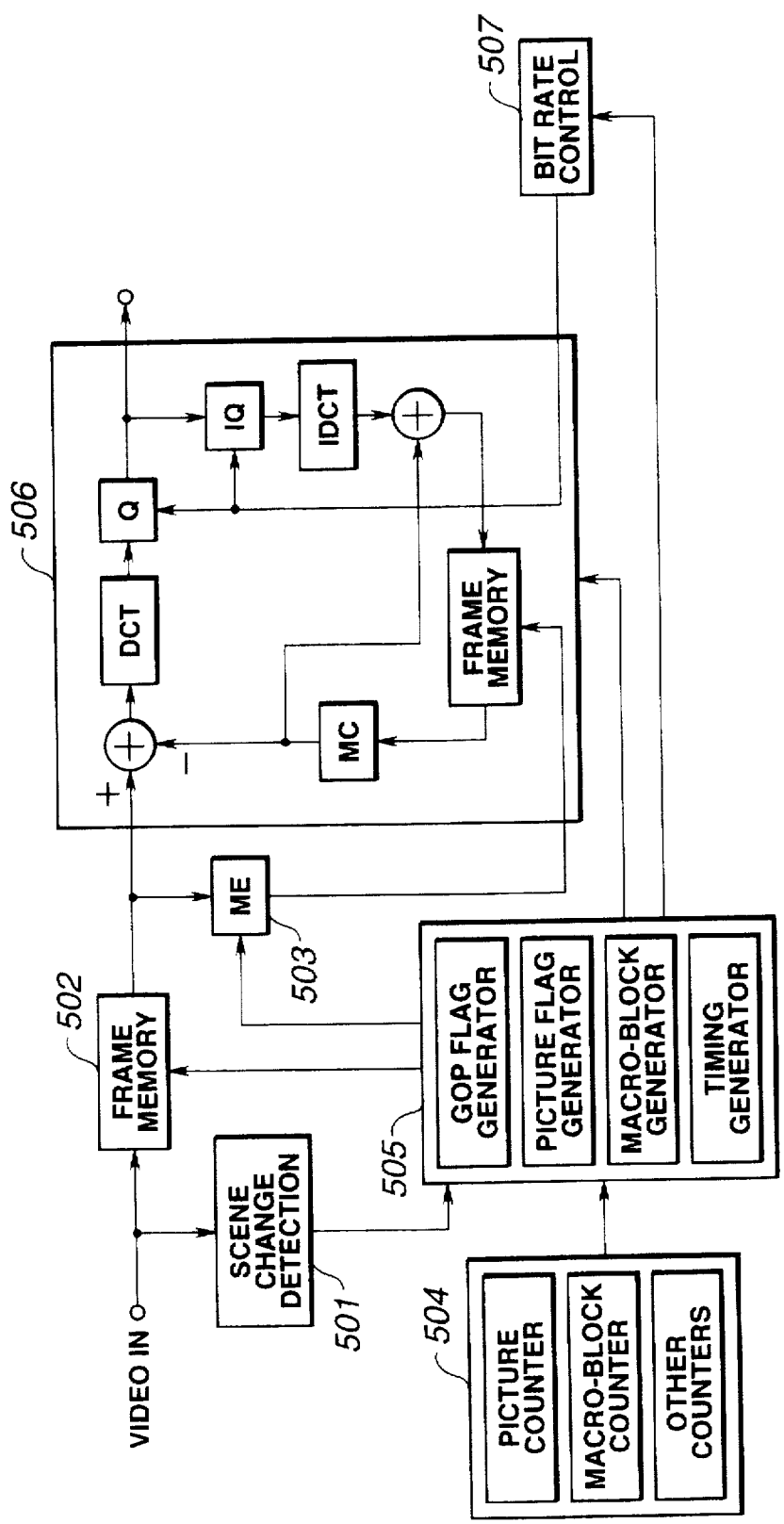
FIG. 2 is a block diagram showing the construction of an encoding apparatus according to the background art.
Figure 3:
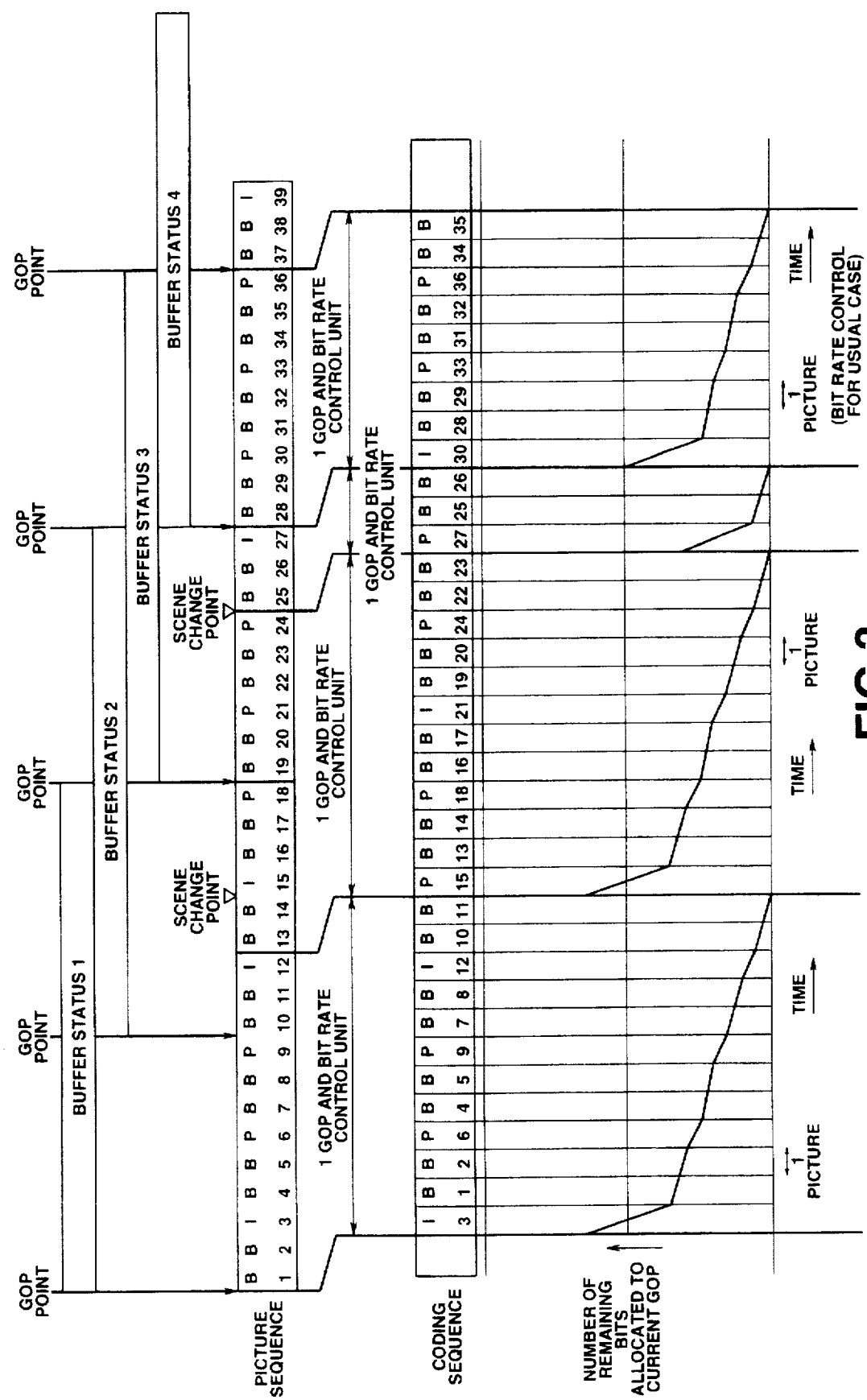
FIG. 3 illustrates picture type management in a case in which a scene change has occurred in the encoding apparatus of FIG. 2.

Initially, it should be noted that, with the encoding apparatus of the background art, as shown in FIG. 3, the range of bit rate control in the transmission of a bitstream obtained by encoding is the same as the GOP range, and the number of residual bits is set as the scheduled number of bits for a GOP under consideration. The number of the residual bits is controlled to be decreased each time a picture of the GOP is encoded such that it becomes zero after encoding the last picture in the GOP.

Conversely, with the encoding apparatus 100 according to this invention, the range of bit rate control differs from the GOP range, as shown in FIG. 6, such that, for the GOP range of, for example, from I(3) to B(8) in the encoding sequence, the range of bit rate control is from the B-picture B(1) which is next to the I-picture I(3) to the I-picture I(12) of the next GOP. By performing bit rate control on the I-picture I(12), a large number of residual bits are left at a trailing end of a GOP. The encoding apparatus 100 according to this invention exploits the fact that bits are left at the trailing end of the GOP.

Figure 7:
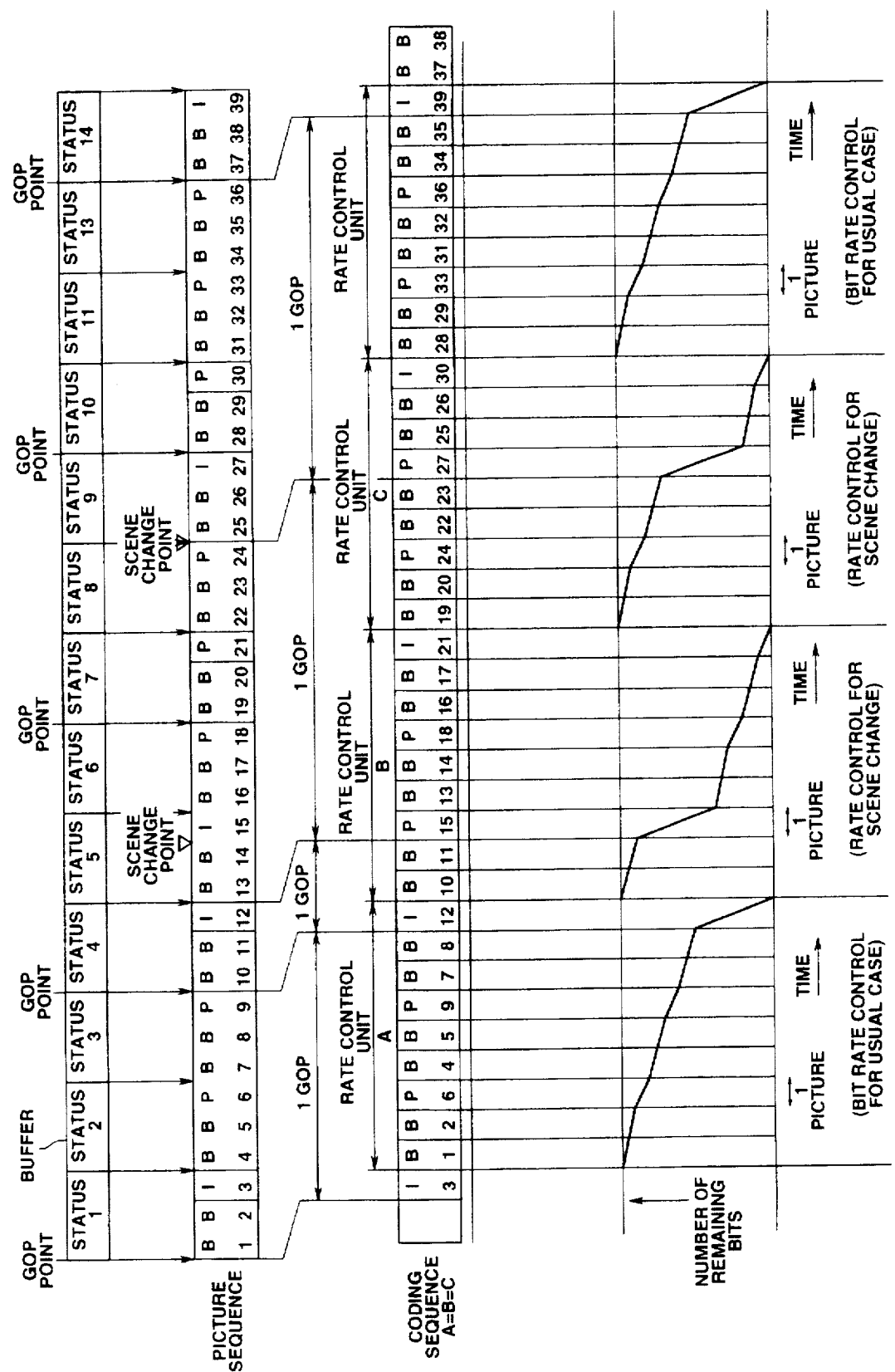
FIG. 7 illustrates picture type management for scene change occurrences in the encoding apparatus of FIG. 5.

More specifically, if video signals are supplied to the encoding apparatus in the picture sequence of B(1), B(2), I(3), B(4), B(5), P(6), . . . , as shown in Fig.7, the first three pictures, namely B(1), B(2) and I(3), are first stored in the frame memory 102. This is termed buffer status 1.

The timing control circuit 105 then generates and transmits timing control signals which will cause the last entered picture I(3) to be read out first from the frame memory 102 to the encoding processing circuit 106 and to the ME circuit 103. The timing control circuit 105 then generates and transmits timing control signals which will cause the pictures B(1) and B(2) to be read out in this sequence from the frame memory 102 to the encoding processing circuit 106 and to the ME circuit 103.

In this manner, the pictures I(3), B(1) and B(2) are supplied in the stated sequence to the encoding processing circuit 106, and the above-mentioned encoding operation is performed on the sequentially supplied pictures in a manner as described above.

The timing control signals generated by the timing control circuit 105 are also supplied to the rate control circuit 107. The rate control circuit 107 is reset by the timing control signal from the timing control circuit 105 at a time point when the picture B(1) next following the picture I(3) is supplied to the encoding processing circuit 106.

Then, three pictures B(4), B(5) and P(6) are stored in the frame memory 102. This is termed buffer status 2.

In this case, the timing control circuit 105 generates and transmits timing control signals which will cause the above pictures to be read out from the frame memory 102 to the encoding processing circuit 106 and to the ME circuit 103 in the sequence of P(6), B(4) and B(5). The encoding processing circuit 106 again encodes the pictures sequentially supplied thereto from the frame memory 102.

Then, three pictures B(7), B(8) and P(9) are stored in the frame memory 102. This is termed buffer status 3.

In this case, the timing controlling circuit 105 generates and transmits timing control signals which will cause the above pictures to be read out from the frame memory 102 to the encoding processing circuit 106 and to the ME circuit 103 in the sequence of P(9), B(6) and B(8). The encoding processing circuit 106 once again encodes the pictures sequentially supplied thereto from the frame memory 102.

With the encoding apparatus 100, since nine pictures of the input video signals are grouped together as one GOP, the timing control circuit 105 detects a GOP point after entry of the ninth picture P(9) based on the count value of the picture counter 104a in the counter 104. Since no scene change is produced in buffer status 1, 2 or 3, the timing control circuit 105 sets the range of one GOP from I(3) to B(8) in the encoding sequence, and routes a GOP flag specifying the GOP point from the GOP flag generator 105a to the VLC circuit 109 and to the rate controlling circuit 107. At this time, a large number of bits, among the bits allocated to the GOP, are left in the last picture B(8) of the GOP.

Then, three pictures B(10), B(11) and I(12) are stored in the frame memory 102. This status is termed buffer status 4.

In this case, the timing control circuit 105 generates and transmits timing control signals which will cause the above pictures to be read out from the frame memory 102 to the encoding processing circuit 106 and to the ME circuit 103 in the sequence of I(12), B(10) and B(11), and further cause the read out pictures to be encoded by the encoding processing circuit 106.

The timing control circuit 105 has already set the pictures I(3) to B(8) as one GOP in the encoding sequence. Before the picture B(10) next following the last picture of the GOP thus set, that is the B-picture B(10) next to the picture I(12) in FIG. 7, is supplied to the encoding processing circuit 106, the fixed length setting point flag generator 105d of the timing control circuit 105 routes a flag specifying a fixed length setting point to both the rate controlling circuit 107 and the VLC circuit 109.

The rate control circuit 107 detects the flag from the fixed length setting point flag generator 105d and, in response to such detection, the rate control circuit 107 resets the number of residual bits for the current GOP and sets the amount or number of residual bits allocated to the next GOP.

The VLC circuit 109 detects the flag from the fixed length setting point flag generator 105d and inserts this flag as a fixed length point flag in a picture header of the first picture within the range of the executed bit rate control, that is, within the picture header of the picture B(10), as will now be described in detail.

Figure 15:
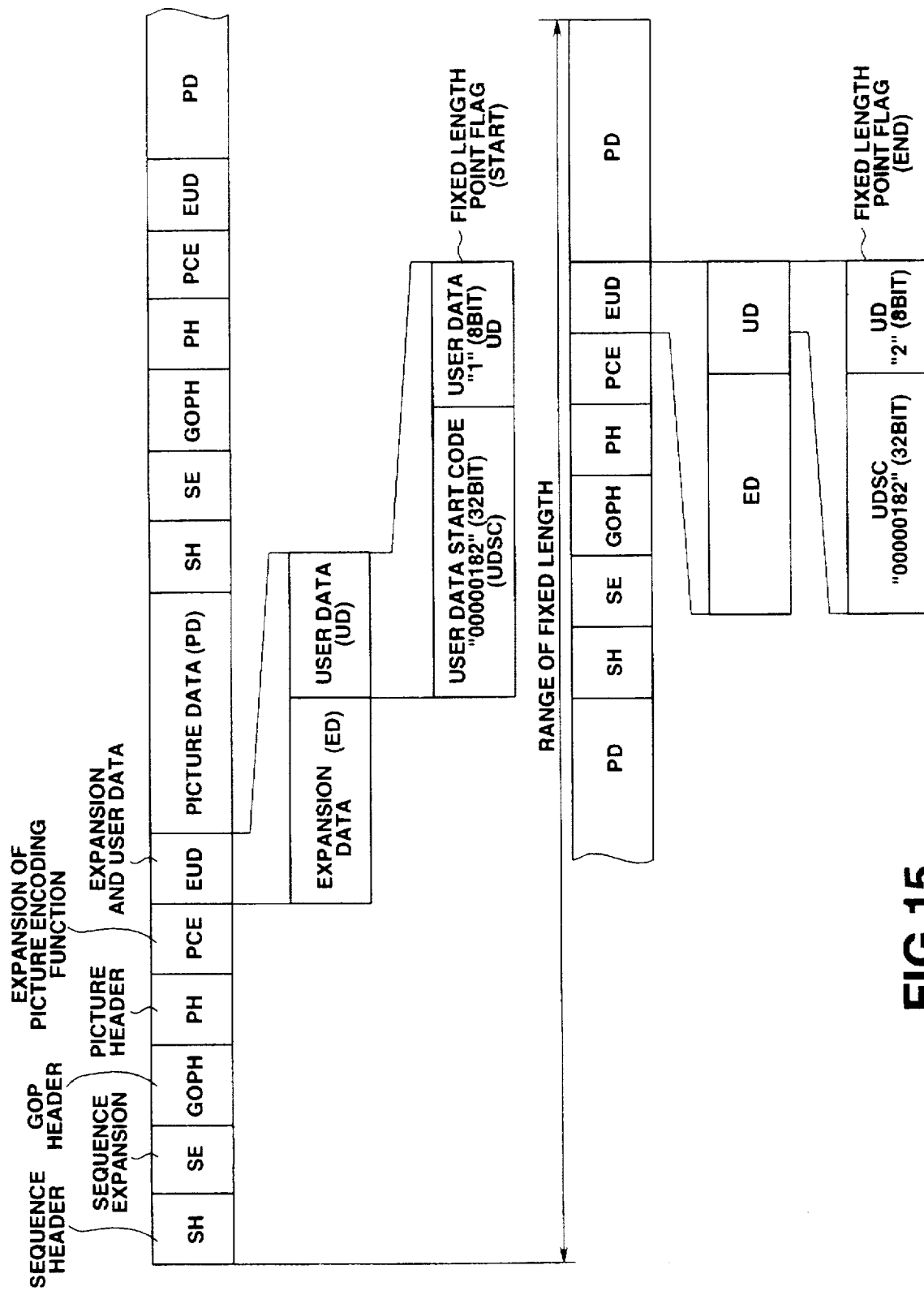
FIG. 15 illustrates a bitstream format of the MPEG2 system.

In a bitstream of the MPEG2 system, for example, as shown in FIG. 15 and hereafter described in further detail, a sequence expanding portion is provided directly after the sequence header. This sequence expanding portion is used as an index for discriminating the MPG2 system, in which such sequence expanding portion exists, from the MPEG1 system in which no sequence expanding portion exists. The sequence expanding portion describes various tools provided in the MPEG2. By means of such sequence expanding portion and a function expanding portion, the bitstream of the MPEG2 system can realize a large number of additional functions while maintaining interchangeability with the MPEG1 system.

If the MPEG2 system is used for the encoding apparatus 100 embodying this invention, "11 11 11 11 (BYTE)" is inserted as the fixed length point flag in one byte (=8 bit) area in the expansion portion following the picture encoding function expanding portion and in the user data in the user data portion, as a way of inserting the above-mentioned fixed length point flag in the picture header.

If the fixed length point flag is detected from the bitstream outputted by the VLC circuit 109, the output control circuit 112 controls the output interfacing circuit 111 and the code buffer 110 for adding bits corresponding to a deficit portion of one fixed length between the fixed length point flag and the next fixed length point flag.

The fixed length point flag is inserted in this manner in a picture header of the first picture of a scheduled bit rate control unit in response to the flag outputted by the fixed length setting point flag generator 105d. The bit rate control range or unit (A) is set so as to differ from the GOP range, that is, it is set to a range from one fixed length point flag to the next fixed length point flag, for example, from the picture I(3) to the picture I(12) of the next GOP. Consequently, bit rate control is performed on the last I-picture I(12) of the bit rate control range or unit with the large number of bits left on encoding the last picture B(8) of the GOP.

Then, three pictures B(13), B(14) and I(15) are stored in the frame memory 102. This status is termed buffer status 5.

If a scene change is detected at the 15th picture I(15), the timing control circuit 105 sets the pictures I(12) to B(11) as one GOP in the encoding sequence. The timing control circuit 105 generates a timing control signal by which the 15th picture, accompanying a time slot which should inherently be allocated to a P-picture, is processed as an I-picture. In other words, the timing control circuit 105 generates and transmits a timing control signal which will cause the picture I(15) to be initially read out from the frame memory 102 to the encoding processing circuit 106 and to the ME circuit 103. Consequently, the number of residual bits allocated to the GOP is significantly reduced at this picture I(15).

This sets the buffer status 6 in which three pictures B(16), B(17) and P(18) are stored in the frame memory 102. When buffer status 7 is reached in which three pictures B(19), B(20) and P(21) have been stored in the frame memory 102, the timing control circuit 105 produces a timing control signal by which the 21st picture, occupying a time slot which should inherently be allocated to an I-picture, is processed as a P-picture.

In other words, in buffer status 7, the timing control circuit 105 generates, and transmits to frame memory 102, a timing control signal which will cause the picture P(21) to be read out last from the frame memory 102 to the encoding processing circuit 106 and to the ME circuit 103.

On the other hand, the fixed length point flag generator 105d of the timing control circuit 105 routes a flag specifying a fixed length point to the rate control circuit 107 and to the VLC circuit 109 at such a timing that the bit rate control range or unit (B) of the current GOP will be the same as the earlier bit rate control range or unit (A) irrespective of the scene change detection and the results thereof. Consequently, the bit rate control range (B) differs from the GOP range, such that bit rate control is executed at all times in a pre-set range.

If buffer status 8, in which three pictures B(22), B(24) and P(24) are stored in the frame memory 102, and buffer status 9 in which three pictures B(25), B(26) and I(27) are stored in the frame memory 102, have been attained, while a scene change has been detected in the 25th picture B(25), the timing control circuit 105 sets the pictures I(15) to B(23) in the encoding sequence as one GOP, starting from the previously mentioned time of detecting the scene change at the 15th picture. The timing control circuit 105 also generates a timing control signal by which the 25th picture, in a time slot which should inherently be allocated to a P-picture, will be processed as the I-picture I(27).

In buffer status 10, in which three pictures B(28), B(29) and P(30) are stored in the frame memory 102, timing control circuit 105 generates a timing control signal by which the 28st picture, in a time slot which should inherently be allocated to an I-picture, will be processed as the P-picture P(30).

On the other hand, the fixed length point flag generator 105d routes a flag specifying a fixed length point to the rate control circuit 107 and to the VLC circuit 109 at such a time that the bit rate control range or unit (C) of the current GOP will be the same as the bit rate control ranges (A) and (B) irrespective of the results of scene change detection. Consequently, the bit rate control range (C) differs from the GOP range, and bit rate control is executed at all times in a pre-set range.

The bit rate control sequence performed by the bit rate control circuit 107 will be explained in detail with reference to the flow chart of FIG. 8.

In general, the rate control circuit 107 may be constituted by a suitably programmed micro-computer (not shown). When such micro-computer is started, parameters are first initialized at step $S4_1$ to enter an interrupt awaiting state at step $S4_2$. If an interrupt is applied, the above-mentioned processing mode flag and the picture type information from the timing control circuit 105 are seized at steps $S4_3$, and $S4_4$ in order to judge the nature of the interrupt.

Figure 4:
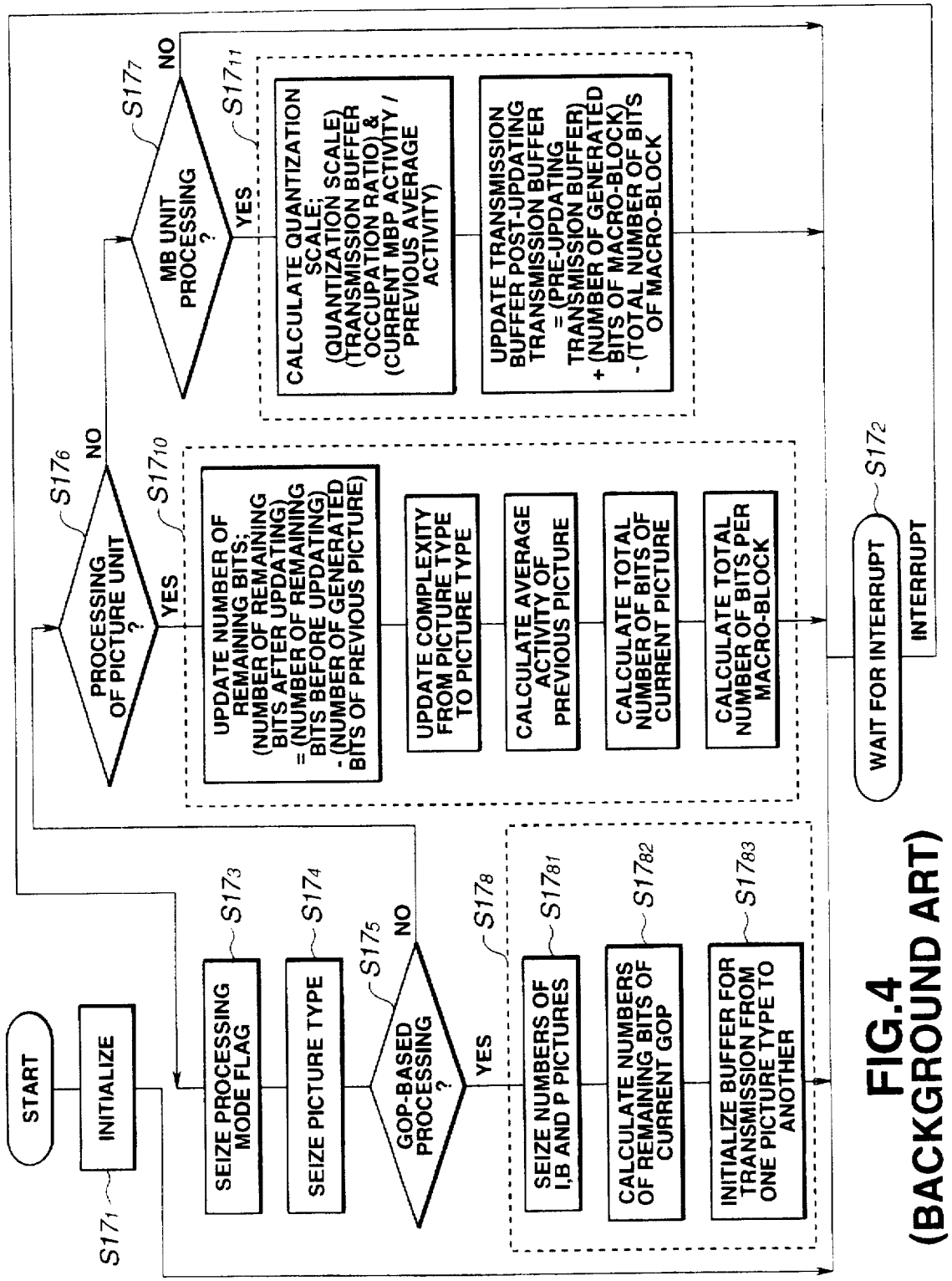
FIG. 4 is a flowchart showing bit control in the encoding apparatus of FIG. 2.

In the background art illustrated in FIG. 4, a judgment as to whether the interrupt is GOP-based, picture-based or macro-block-based is effected by detecting the GOP flag, picture flag or the macro-block flag from the processing mode flag. However, with the encoding apparatus 100 embodying this invention, the fixed length flag is detected in place of the GOP flag specifying that the interrupt is GOP-based. If this fixed length flag is detected, fixed length unit based processing is performed.

Figure 8:
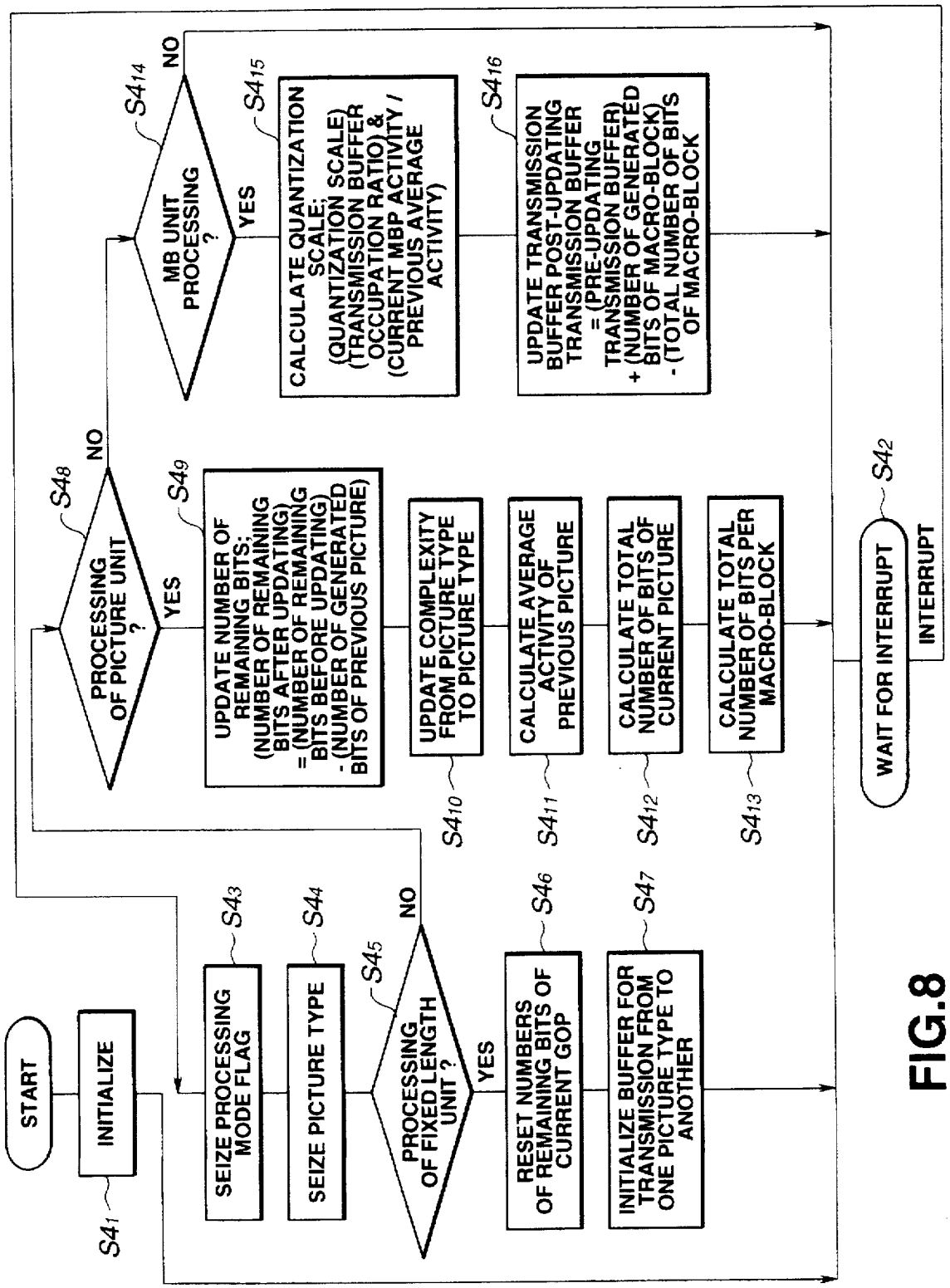
FIG. 8 is a flowchart to which reference is made in explaining bit rate control with the apparatus of FIG. 5.

More specifically, in FIG. 8, it is judged whether or not the fixed length flag has been detected from the processing mode flag at step $S4_5$. If this fixed length flag is detected, the number of residual bits of the current GOP is reset in step $S4_6$, and the code buffer 110 is reset from one picture type to another in step $S4_7$ prior to returning to step $S4_2$ in order to await an interrupt. In other words, since the bit rate control range is constant with the encoding apparatus 100, it is unnecessary to calculate the length intended to be fixed, and it is only necessary to reset the number of residual bits.

If the fixed length setting flag is not detected at step $S4_5$, the program proceeds to step $S4_8$ in which it is judged from the processing mode flag whether or not the picture flag has been detected from the processing mode flag.

If the picture flag has been detected in $S4_8$, the number of residual bits is updated at step $S4_9$. The number of residual bits is found by subtracting the number of bits actually found in the previous picture from the number of residual bits prior to updating. The number of residual bits subsequent to updating, as thus found, is used as the number of residual bits of the current picture.

The degree of complexity is then found from the mean value of the quantization scale of the previous picture and updated from one picture type to another in step $S4_{10}$.

The average activity, such as, a value of the spatial resolution of the previous picture, is then calculated in step $S4_{11}$.

The total number of bits of the current picture is then calculated in step $S4_{12}$, and then the total number of bits is calculated from one macro-block to another in step $S4_{13}$ prior to returning to step $S4_2$ in order to await an interrupt.

If no picture flag has been found at step $S4_8$, the program proceeds to step $S4_{14}$ where it is judged from the processing mode flag whether or not the macro-block has been detected.

If the macro-block has been detected, the quantization scale is determined in step $S4_{15}$ on the basis of the storage ratio of the code buffer 110 and on the basis of the ratio of the mean activity of the previous picture to the macro-block activity of the current picture.

In the next step $S4_{16}$, the code buffer 110 is updated, using the number of the actually produced or generated bits in the macro-block and the total number of bits intended to be included in a micro-block, and then the program is returned to step $S4_2$ in order to await an interrupt.

If, with the above-described encoding apparatus 100, the GOP range without scene change is set to extend from an I-picture to the picture prior to the I-picture of the next GOP in the encoding sequence, a range extending from a picture next to the I-picture to the I-picture of the next GOP is used as the range of bit rate control. If a scene change has occurred, the bit rate control range is kept constant, and a picture inherently scheduled to be processed as a P-picture, that is, a picture appearing as a P-picture in the original picture sequence, is processed as an I-picture, and the number of residual bits which should be ultimately left is allocated to a forward portion of the GOP. If an I-picture is allocated first by a scene change as described above, the last picture in the bit rate control range is a P-picture. In addition, the range of one GOP is set in this case as the range from the first allocated I-picture to the next I-picture.

In this manner, fixed length setting may be reliably achieved within a range of executed bit rate control. In addition, since fixed length setting may be achieved reliably, data writing and re-writing may be reliably performed in a pre-set range of a recording medium. In addition, since it is only necessary for the frame memory 102 to have a storage capacity of at least three pictures, the memory size can be significantly less than that with the conventional apparatus, thus further lowering the cost of the apparatus.

Figure 9:
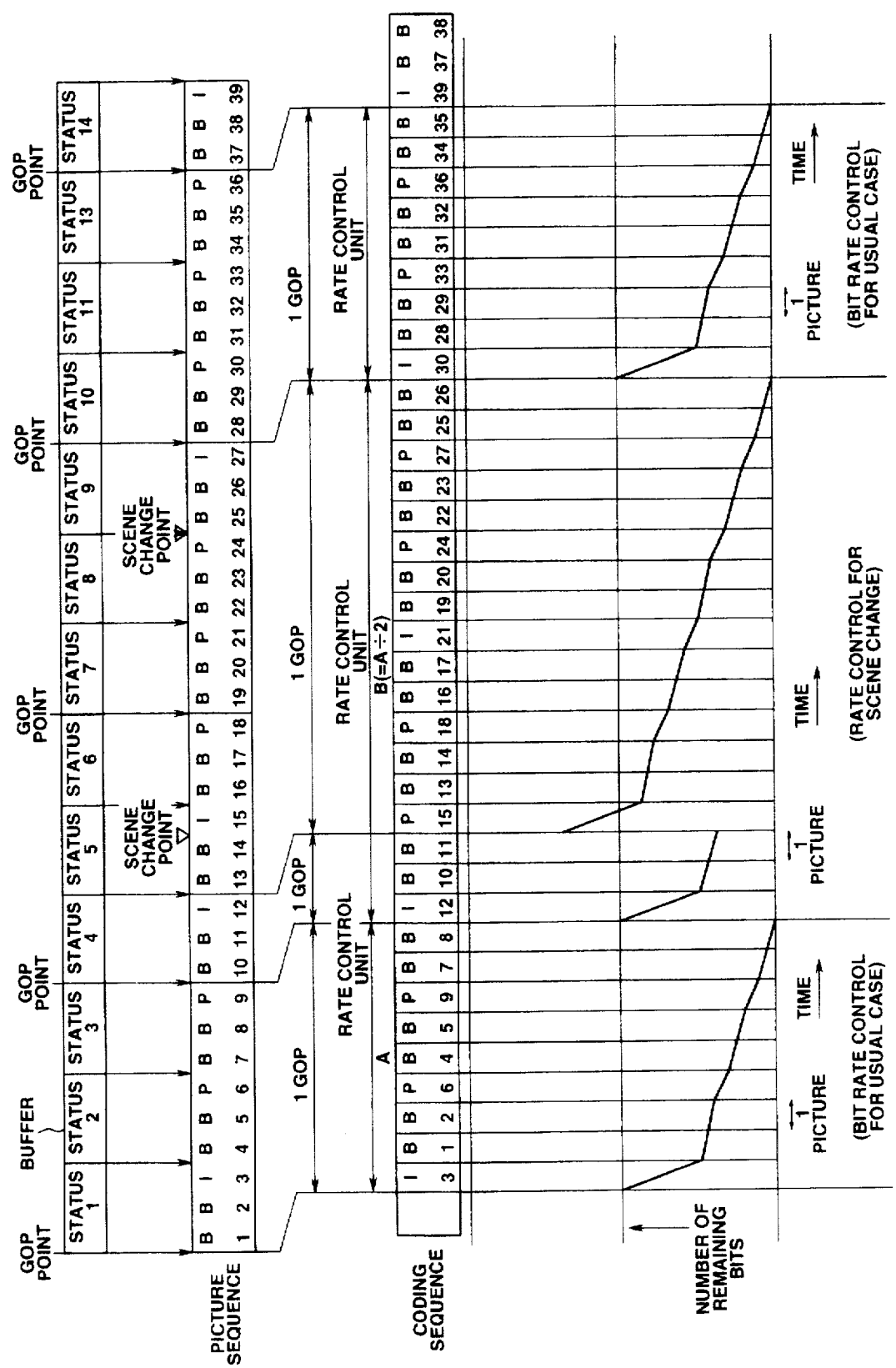
FIG. 9 illustrates picture type management in case the bit rate control is enhanced by a factor of two.
Figure 10:
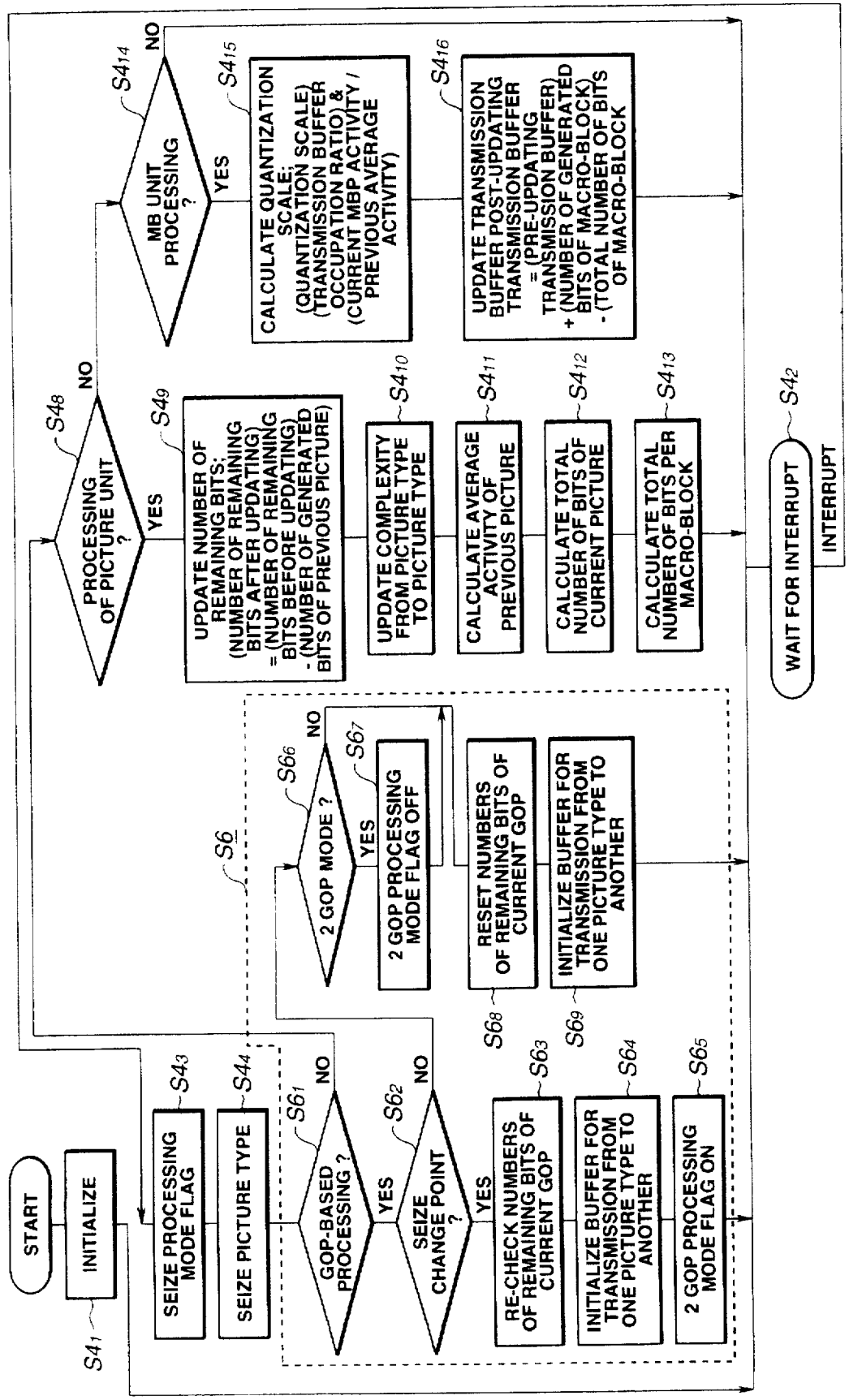
FIG. 10 is a flowchart to which reference will be made in explaining bit rate control in case the bit rate control is enhanced by a factor of two.

An encoding apparatus which is a modification of the embodiment of the invention described with reference to FIGS. 5–8, will now be described with reference to FIGS. 9 and 10 as having bit rate control operations different from those described above for the encoding apparatus 100, although the modified encoding apparatus is structurally similar to the encoding apparatus 100. More particularly, FIG. 9 shows picture management in the modified encoding apparatus, while FIG. 10 shows, in a flowchart, the bit rate control processing employed in the modified apparatus. The GOP range in the absence of scene changes and the bit rate control range for such case are the same as in the background art and hence are not explained in detail.

In addition, with the exception of the routine or sequence of steps indicated at S6 on FIG. 10, it is to be noted that the sequence of operations in the flowchart of FIG. 10 is the same as that in the flowchart for bit rate control shown in FIG. 8. Therefore, the steps indicating the same operations described above with reference to FIG. 8 are denoted by the same reference numerals, and are not further explained in detail herein.

If, in buffer status 5 in which three pictures B(13), B(14) and I(15) have been stored in the frame memory 102, a scene change has been detected by the scene change detection circuit 101 at the I(15) picture, the timing control circuit 105 sets I(12) B(10) and B(11) as one GOP in the encoding sequence, as in the earlier-described embodiment, and generates a timing control signal at the next GOP by which the 15th picture, occupying a time slot which should inherently be allocated to a P-picture, will be processed as an I-picture I-(15).

The number of bits for the I-picture, among the number of residual bits allocated by the rate control circuit 107, is already used up at the time of encoding the I-picture I(12). Therefore, in the embodiment being described with reference to FIGS. 9 and 10, the bit rate control range is increased by a factor of two.

Referring now to FIG. 10, it will be seen that, in the bit rate control sequence of the modified encoding apparatus according to this invention, after the picture type information has been seized in step $S4_4$, it is judged, in step $S6_1$, of sub-routine S6, whether or not the GOP flag has been detected in place of judging, as in step $S4_5$ on FIG. 8, whether or not the fixed length setting flag has been detected from the processing mode flag.

If the GOP flag is detected, it is then judged whether or not a scene change has been detected in step $S6_2$.

If a scene change has been detected, it is assumed that GOP-based processing has to be performed due to occurrence of such scene change. Thus the number of remaining bits of the current GOP has to be checked at step $S6_3$ in order to effect bit rate control in terms of two GOPs, that is 18 pictures, as a unit. The code or transmission buffer 110 is initialized from one picture type to another in the next step $S6_4$ and, in order to prohibit interrupts in connection with the GOP-based processing at the next inherent GOP point, the code buffer 110 turns-on an internal flag in step $S6_5$ for indicating the 2 GOP-based processing and returns the program to step $S4_2$ for awaiting an interrupt.

If no scene change has been detected in step $S6_2$, that is, if the processing is the usual GOP-based processing, it is checked in step $S6_6$ whether or not the internal flag specifying the 2-GOP-based processing has been turned on.

If the internal flag specifying the 2-GOP based processing has been turned on, the internal flag is turned off in step $S6_7$ in order to return to the interrupt awaiting state in step $S4_2$.

In the modified embodiment being here described, the number of residual bits, scheduled to be used in the next GOP, is used in the current GOP as in step $S6_8$, while the I-picture, scheduled to be allocated to the next GOP, is processed as a P-picture as in step $S6_9$. If the mode of doing bit rate control in terms of two GOPs as a unit is entered, a flag indicating such processing mode is turned on. If, with such flag on, a new scene change has occurred, this scene change is overridden. This assures that, if a scene change has occurred, fixed length is maintained within the range of two GOPs, thus assuring reliable fixed length setting within the bit rate control range and allowing for more flexibility in coping with scene changes. Since fixed length setting can be reliably achieved, writing and re-writing in a pre-set range on a recording medium can be reliably effected. Since it is only necessary for the frame memory 102 to have a storage capacity for at least three pictures, the memory size can be significantly reduced as compared to that required in the background art thus lowering the production cost of the apparatus.

Figure 11:
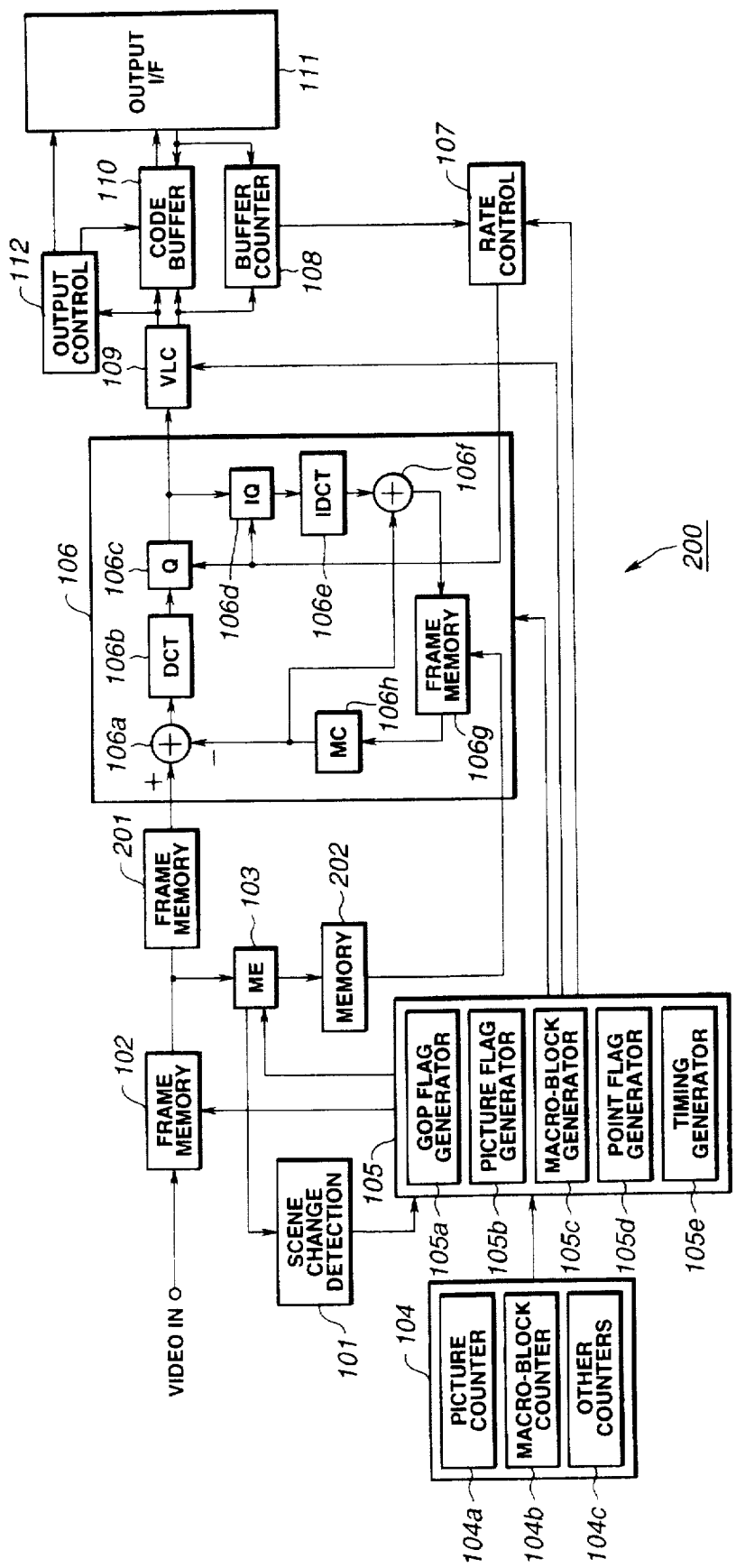
FIG. 11 is a block diagram showing the construction of an encoding apparatus according to a modified embodiment of the present invention.

An encoding apparatus 200 according to another embodiment of the invention is shown in FIG. 11 to comprise a new frame memory 201 and a memory 202 in addition to the components of the encoding apparatus 100 shown in FIG. 5. In the encoding apparatus 200, shown in FIG. 11, the parts or components corresponding to those shown in FIG. 5 are denoted by the same numerals and operate similarly so that such parts are not here further explained in detail.

With the encoding apparatus 200, the frame memory 201 is provided downstream of the frame memory 102, so that an output of the frame memory 102 is applied to the frame memory 201 and an output of the frame memory 201 is supplied to the subtraction circuit 106a of the encoding processing circuit 106. The memory 202 is provided downstream of the ME circuit 103 which has an output supplied to the memory 202 while the output of memory 202 is supplied to the frame memory 106g of the encoding processing circuit 106. In the encoding apparatus 200, the scene change detection circuit 101 is supplied with the motion vector outputted by the ME circuit 103 instead of with the input video signals.

It will be appreciated that the encoding apparatus 200 is configured for detecting scene changes by exploiting motion vector detection operations performed by the ME circuit 103. Similarly to the encoding apparatus 100, the encoding apparatus 200 converts the P-picture into an I-picture for processing the P-picture as the I-picture so as to reduce the volume of the code generation in case there is no correlation on the time axis despite motion compensation executed by the MC circuit 106b with the result that the amount of the generated code information cannot be reduced on calculating inter-picture differences.

In the encoding apparatus 100 shown in FIG. 5, a scene change is detected by integrating the inter-picture differences for one picture period. Therefore, panning a picture may be erroneously detected as being a scene change.

With the encoding apparatus 200, the foregoing problem is avoided by integrating residuals found at the time of motion vector detection in the ME circuit 103 so as to be capable of predicting the differential information amount after motion compensation by the MC circuit 106, instead of simply finding the inter-picture differences.

In other words, the ME circuit 103 detects the motion vector across the interval between I-pictures. Therefore, for exploiting the detected motion vector, the motion vector detected by the ME circuit 103 needs to be stored for one I-picture period.

The memory 202 stores the motion vector produced by the ME circuit 103 for one I-picture period. The frame memory 201 has a storage capacity of one picture and stores one picture of the input video signals stored in the frame memory 102. Thus the input video signals are stored in the frame memory 201 for one picture period.

The scene change detection circuit 101 finds the sum of absolute values of residuals obtained at the time of motion vector detection by the ME circuit 103. If a scene change has been detected, the information on the sum of the absolute values is routed to the timing control circuit 105.

Meanwhile, by utilizing the residuals found at the time of motion vector detection as described above, a scene change may be detected at the time of bi-directional predictive coding by the motion vector extending in one or the opposite direction. Thus, if a scene change has actually occurred in a B-picture, it can hardly be detected as being a scene change in the B-picture. However, since the P-picture is converted by the encoding apparatus 200 into the I-picture, the use of residuals may be said to be most appropriate for detecting scene changes. Consequently, fixed length setting can be achieved more reliably in the bit rate control range, while scene changes can be coped with more flexibly. Since fixed length setting can be achieved more reliably, writing and re-writing may be achieved more reliably in a pre-set range of the recording medium. In addition, it is sufficient that the frame memory 102 have a storage capacity of at least three pictures, while it is sufficient that the frame memory 201 have a storage capacity of at least one picture, so that the memory size can be reduced more significantly than with the prior-art apparatus, for further reducing the production cost of the apparatus.

Figure 12:
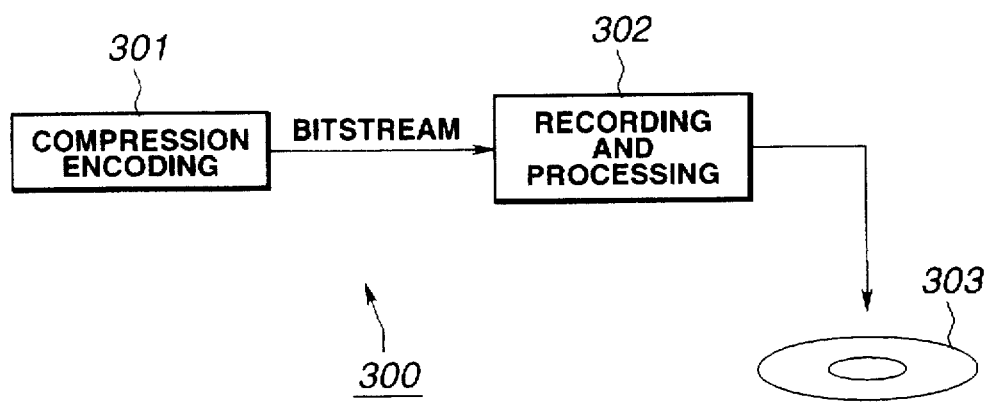
FIG. 12 is a block diagram showing the construction of a recording apparatus for encoded data according to an embodiment of the present invention.

The present invention may also be applied to a recording apparatus 300, for example, as shown in FIG. 12. The recording apparatus 300 includes an encoding circuit 301, which may correspond to the encoding apparatus 100 described above with reference to FIG. 5, and a recording processing circuit 302 for recording an output of the encoding circuit 301 on a recording medium 303 which may be disc-shaped as shown.

Since the encoding circuit 301 may be similar in structure to the encoding apparatus 100 shown in FIG. 5, it will not be again explained in detail.

Figure 13:
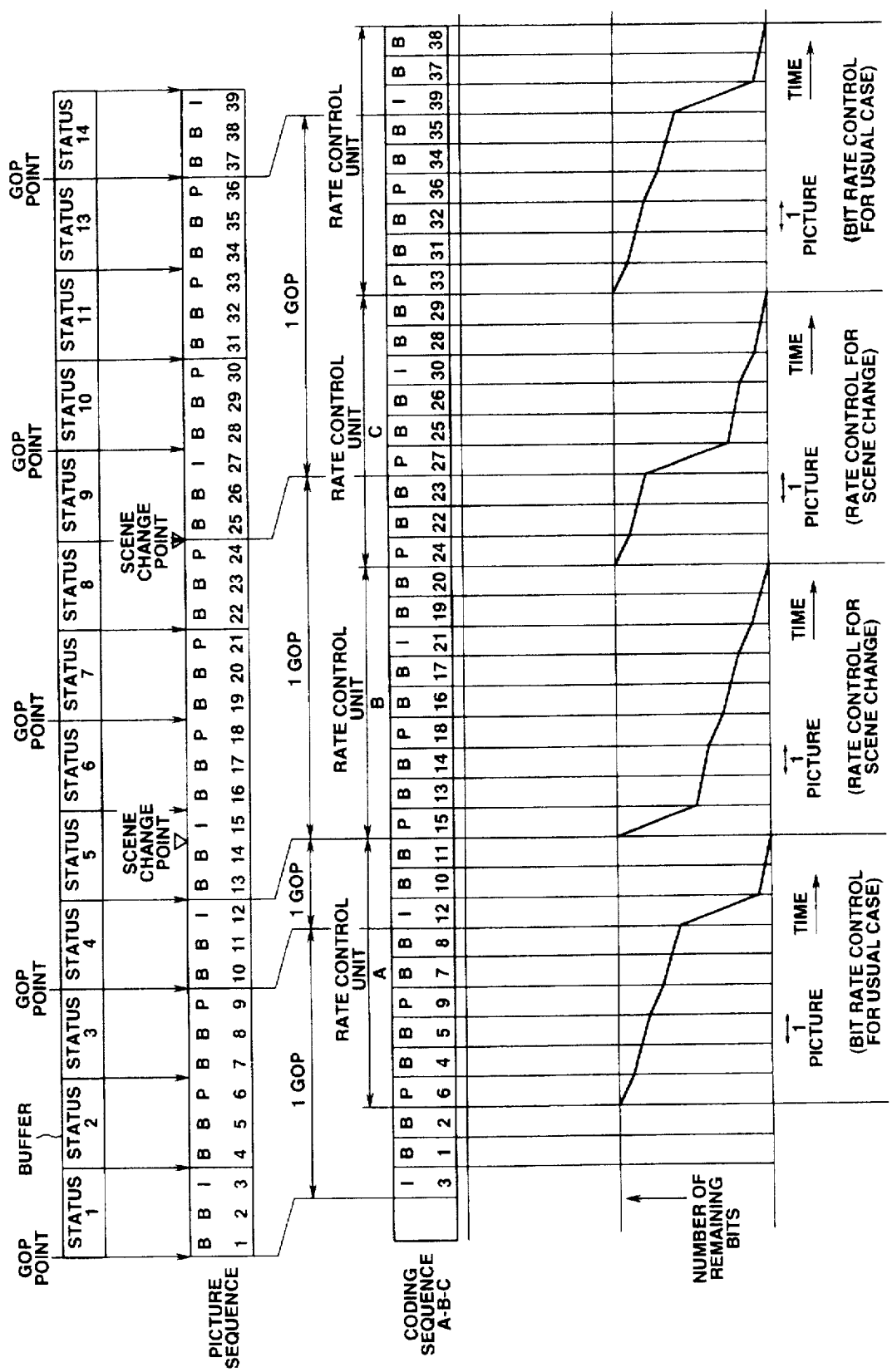
FIG. 13 illustrates picture type management for scene change occurrences in the encoding circuit of the recording apparatus shown in FIG. 12.

The encoding circuit 301 performs bit control as shown in FIG. 13 and transmits the resulting bitstream to the recording processing circuit 302.

Figure 14:
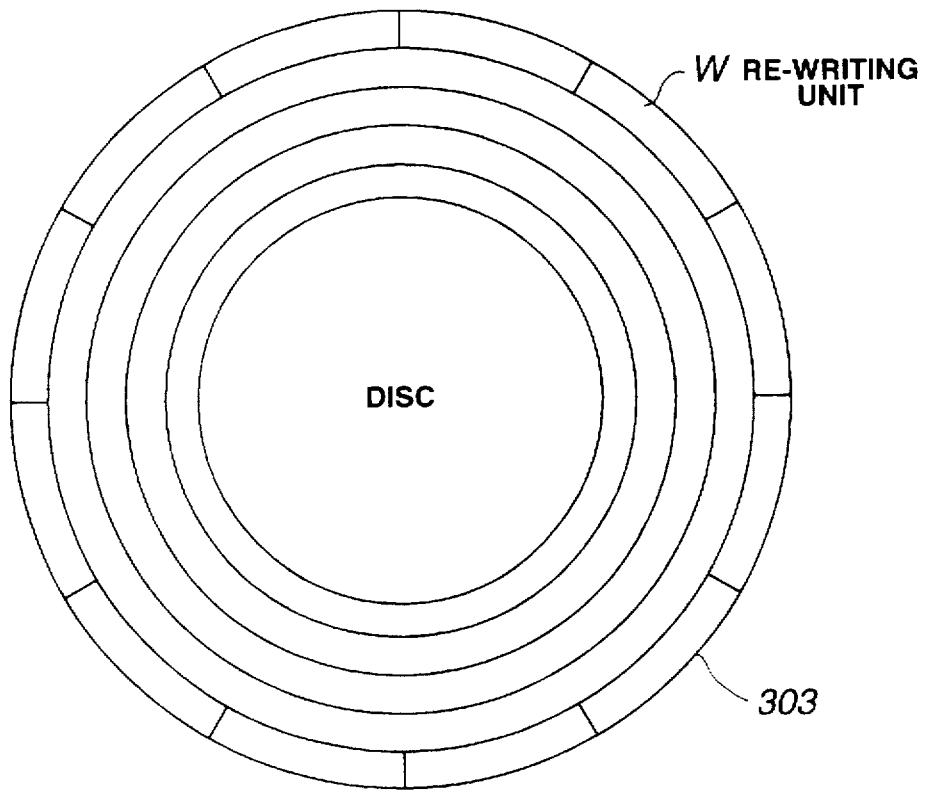
FIG. 14 illustrates a fixed length unit of a disc-shaped recording medium that may be used with the recording apparatus of FIG. 12.

The recording processing circuit 302 records the bitstream from the encoding circuit 301 in a pre-set range on the disc-shaped recording medium 303. The data is recorded on the disc-shaped medium 303 in terms of fixed unit lengths or re-writing units W, as shown in FIG. 14. During such recording on the recording medium 303, the recording processing circuit 302 detects the range of the executed fixed length setting of the bitstream from the encoding circuit 301.

As shown in FIG. 15, the bitstream outputted by the encoding circuit 301 is comprised of data of, for example, the MPEG2 system, and includes plural blocks each having a sequence header SH, a sequence expanding portion SE, a GOP header GOPH, a picture header PH, a picture encoding function expanding portion PCE, an expanding and user data portion EUD and a picture data portion PD.

The expanding and the user data portion EUD is comprised of an expanded data portion ED and a user data portion UD. The user data portion UD is made up of a 32-bit user data start code UDSC and an 8-bit user data UD.

The user data has inserted therein the information concerning the range of the fixed length, that is the above-mentioned fixed length setting point flag. Thus, by detecting the fixed length setting point flag from the supplied bitstream, the recording processing circuit 302 can recognize the range of the executed fixed length setting and record the bitstream on the recording medium 303 in terms of the fixed unit length W.

Figure 16:
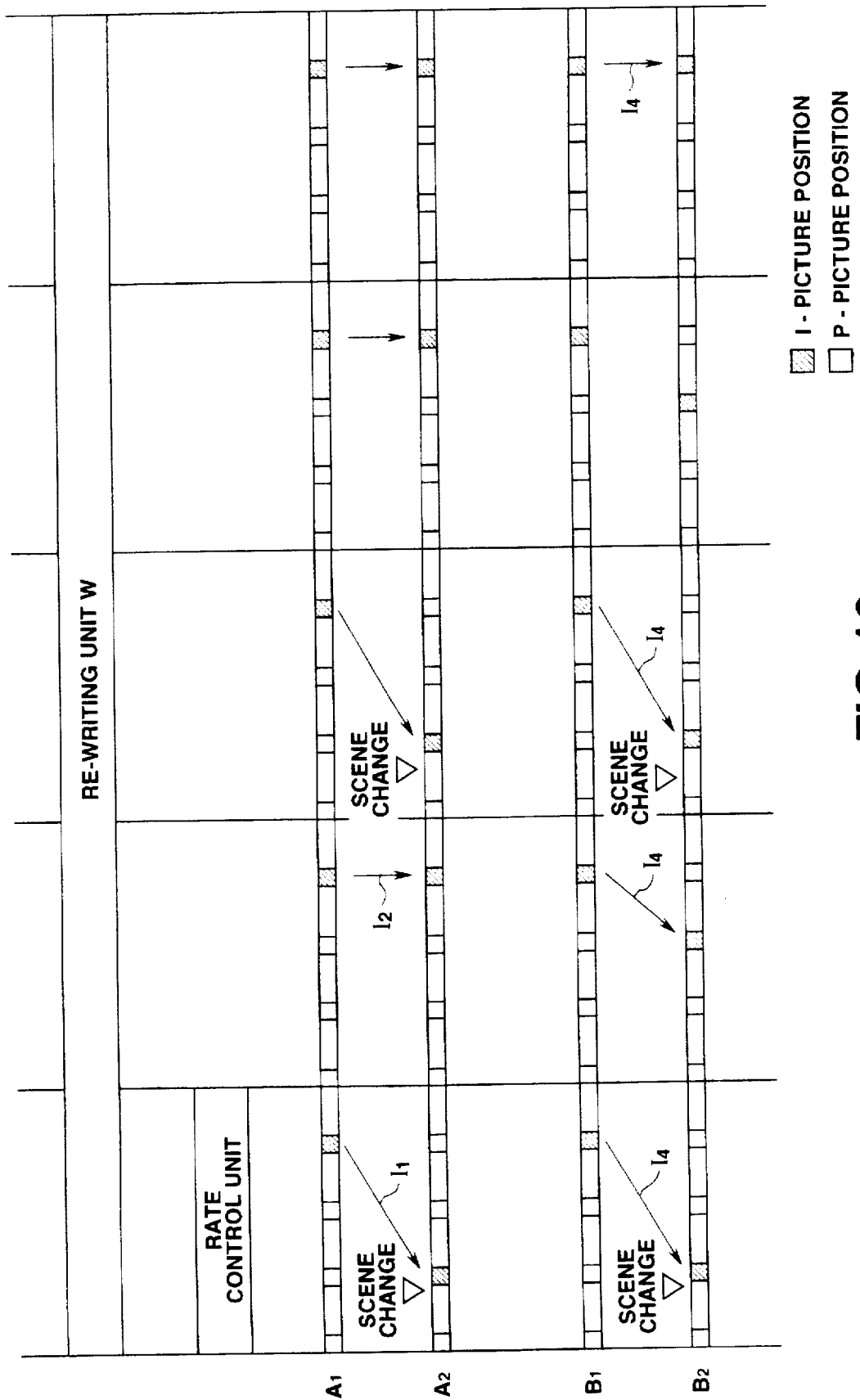
FIG. 16 illustrates a case in which at least one or more bit rate control units are combined in recording the bitstream on the recording medium.

FIG. 16 shows the manner in which picture type management is performed in the recording processing circuit 302 in case at least one or more bit rate control units are combined to form the fixed unit length W of FIG. 14. If there is no scene change, as in bitstream $A_1$ on FIG. 16, I-pictures and P-pictures are arranged at all times at equal intervals in a fixed length unit W. If there is a scene change, for example, as in the bitstream $A_2$, the I-picture $I_{13}$, which is normally disposed at a rear portion of the bit rate control range or unit, is instead disposed at a forward portion of such unit. Thus, in the encoding circuit 301, a larger number of residual bits is used for a picture where a scene change has occurred. If there is no scene change in the range or unit next to the bit rate control range or unit where a scene change has occurred, as in the bitstream $A_2$, the I-picture $I_2$ is disposed at the same position as in the bitstream $A_1$ where no scene change had been produced.

Picture type management in the recording processing circuit 302 will now be explained for the case where the encoding circuit 301 performs bit rate control in the manner described above with reference to FIG. 9, that is, in the case where the normal position of the I-picture is disposed at a leading end of each bit rate control range or unit.

In the bit rate control 107, shown in FIG. 5, the bit rate control range or unit is increased by a factor of two in the event of a scene change for shifting the number of residual bits of the rear side I-picture to a forward position. In the recording apparatus 300, however, the fixed length setting is executed at a constant position. Thus, the bit rate control similar to that shown in FIG. 9 is performed within the fixed length W. However, since the position of execution of the fixed length setting cannot be changed, in the bit rate control of the last picture within the range of the fixed length setting, that picture is changed to an I-picture, so that the residual bits cannot be brought to the forward position.

Figure 17:
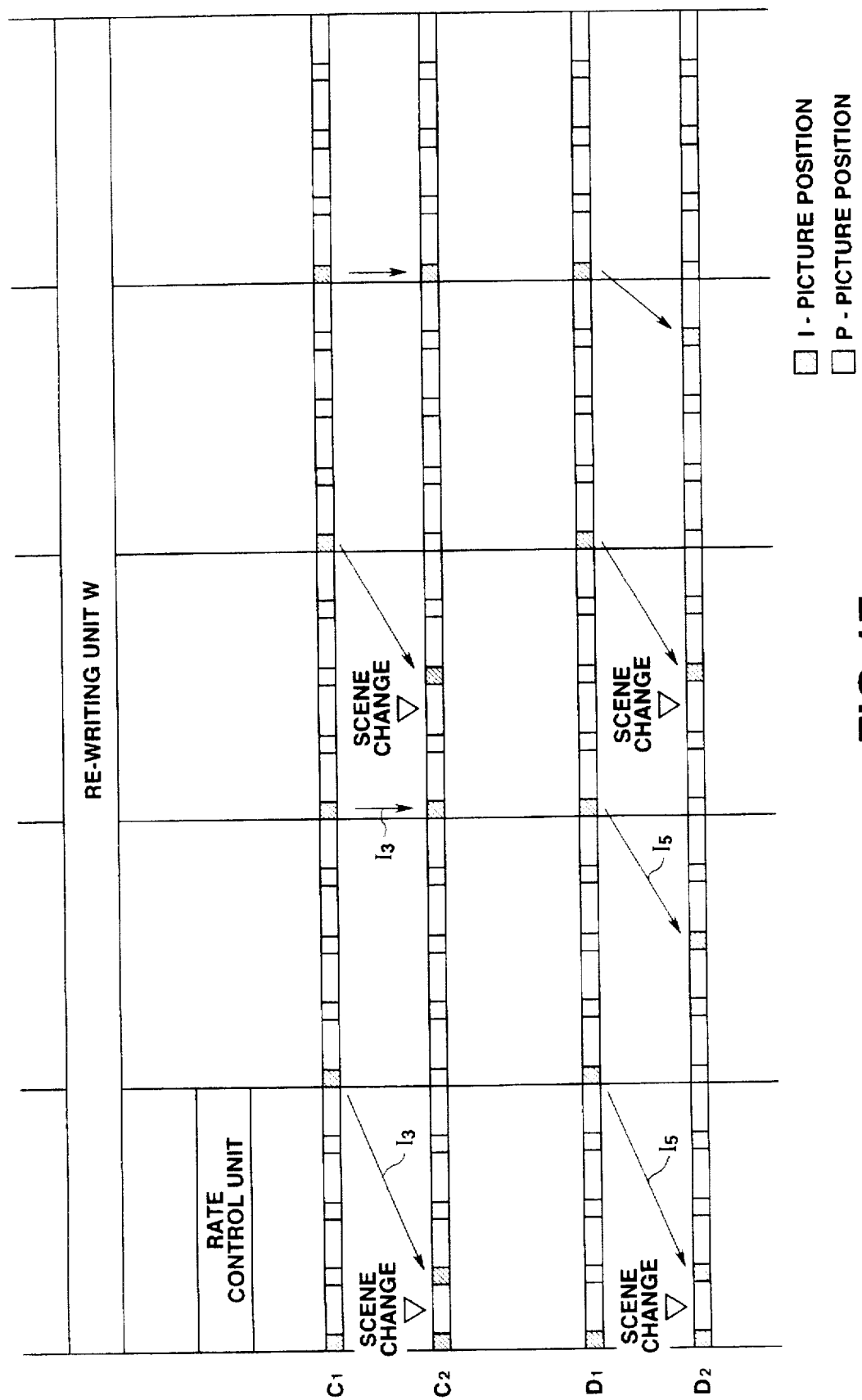
FIG. 17 illustrates a case in which the normal position for the I-picture comes first in bit rate control in recording a bitstream on the recording medium.

More specifically, as shown in FIG. 17, if there is no scene change, as in a bitstream $C_1$, I-pictures and P-pictures are arranged at all times at equal intervals, with the I-pictures being normally positioned at the leading ends of the respective bit rate control units in a fixed length unit W. If there is a scene change, as in a bitstream $C_2$, the I-picture in the next bit rate control unit is disposed at a forward position, as at $I_3$. Thus, in the encoding circuit 301, an increased number of residual bits is used for a picture where a scene change has occurred. However, in any one bit rate control range, the number of residual bits in the next bit rate control range may be shifted only once to the preceding bit rate control range.

Thus it becomes possible to reproduce a high-quality picture free of picture quality deterioration from the recording medium 302 on which data has been correctly recorded in the pre-set range. Since the encoding circuit 301 used in the recording apparatus 300 has a reduced cost of production. The cost of producing the apparatus 300 is similarly reduced.

If a scene change has occurred as previously explained in connection with FIGS. 16 and 17, the following picture type management may also be used.

More specifically, if there are scene changes, as in bitstreams $B_2$ or $D_2$ in FIGS. 16 and 17, respectively, the I-pictures $I_4$ and $I_5$, respectively, subsequent to a scene change may be restored gradually to the normal positions instead of being restored abruptly to the normal positions as in the cases of the bitstreams $A_2$ and $C_2$. Since the distance between the scene change position and the next I-picture position is not excessive, it becomes possible to avoid deterioration in the picture quality.

The encoding circuit 301 of the encoding apparatus 300 has been described as corresponding to the encoding apparatus 100 shown in FIG. 5, but it is apparent that the encoding circuit 301 may alternatively be arranged to correspond substantially to the encoding circuit 200 shown in FIG. 11.

Although specific embodiments of the invention and modifications thereof have been described in detail herein with reference to the accompanying drawings, it is to be understood that the invention is not limited thereto, and that various changes and further modifications may be effected therein by one skilled in the art without departing from the scope or spirit of the invention as defined in the appended claims.

What is claimed is:

1. An encoding apparatus for encoding input video signal data made up of a plurality of pictures received in sequence in accordance with an encoding system exploiting inter-frame prediction and which include at least I-pictures each encoded within a respective frame, comprising:

storage means for storing said sequentially received pictures of input video signal signal data;

change point detection means for detection of change points of said pictures of the input video signal data;

encoding means for encoding the pictures stored in said storage means with a fixed encoding length as an encoding unit so as to generate a bitstream;

timing control means responsive to said change point detection means for determining successive groups of said pictures with each of said groups including at least one of said I-pictures, and for controlling the processing timing of the fixed length encoding of each picture in said group of pictures by said encoding means; and rate control means under control of said timing control means for controlling the range of a code generation rate control in said encoding means in accordance with said detection by said change point detection means so that said range of the code generation rate control begins at a picture next to one of said I-pictures in a group of pictures and terminates at the next I-picture, and so that, upon detection of a scene change by said change point detection means, any residual data previously allocated to said one I-picture is allocated instead to another of said pictures in said group of pictures.

2. The encoding apparatus as in claim 1; wherein said rate control means fixes a starting picture and a number of said pictures contained in said range of the code generation rate control.

3. The encoding apparatus as in claim 1; wherein said rate control means doubles said range of the code generation rate control in case of said detection of a scene change.

4. The encoding apparatus as in claim 1; wherein said rate control means inserts information specifying said range of the code generation rate control in said bitstream.

5. The encoding apparatus as in claim 1; wherein said rate control means overrides said detection by said change point detection means until said another picture is encoded with fixed length encoding by said encoding means.

6. The encoding apparatus as in claim 1; further comprising means for effecting motion vector detection in connection with inter-frame prediction; and wherein said change point detection means detects a change point of said pictures of the input video signal data based on the amount of said residual data at the time of said motion vector detection in inter-frame prediction.

7. A video signal recording apparatus comprising:

an encoding device for encoding input video signal data made up of a plurality of pictures received in sequence in accordance with an encoding system exploiting inter-frame prediction and which include at least I-pictures each encoded within a respective frame, said encoding device including storage means for storing said sequentially received pictures of input video signal data, change point detection means for the detection of change points of said pictures of the input video signal data, encoding means for encoding the pictures stored in said storage means with a fixed encoding length as an encoding unit so as to generate a bitstream, timing control means responsive to said change point detection means for determining successive groups of said pictures with each of said groups including at least one of said I-pictures, and for controlling the processing timing of the fixed length encoding of each picture in each said group of pictures by said encoding means, and rate control means under control of said timing control means for controlling a range of a code generation rate control in said encoding means in accordance with said detection by said change point detection means so that said range of the code generation rate control begins at the picture next to one of said I-pictures and terminates at the next I-picture, and so that, upon detection of a scene change by said change point detection means, any residual data previously allocated to said one I-picture in a group of pictures is allocated instead to another of said pictures in said group of pictures; and recording means for recording said bitstream generated by said encoding means onto a recording medium.

8. The recording apparatus as in claim 7; wherein said rate control means fixes a starting picture and a number of said pictures contained in the range of said code generation rate control.

9. The recording apparatus as in claim 7; wherein said rate control means doubles said range of the code generation rate control in case of said detection of a scene change.

10. The recording apparatus as in claim 7; wherein said rate control means inserts information specifying said range of code generation rate control in said bitstream.

11. The recording apparatus as in claim 7; wherein said rate control means overrides said detection by said change point detection means until said another picture is encoded by fixed unit length encoding by said encoding means.

12. The recording apparatus as in claim 7; wherein said encoding device further includes means for effecting motion vector detection in connection with inter-frame prediction; and wherein said change point detection means detects a change point of said pictures of the input video signal data based on the amount of said residual data at the time of said motion vector detection in inter-frame prediction.

13. A method for encoding video signal data made up of a plurality of pictures received in sequence in accordance with an encoding system exploiting inter-frame prediction and which include at least I-pictures each encoded within a respective frame, comprising the steps of:

temporarily storing said sequentially received pictures of input video signal data;

detecting change points of said pictures of the input video signal data;

encoding the stored pictures with a fixed encoding length as an encoding unit so as to generate a bitstream;

in response to said change point detection, determining successive groups of said pictures with each of said groups including at least one of said I-pictures, and controlling the processing timing of the fixed length encoding of each picture in said group of pictures; and controlling the range of a code generation rate in said encoding in accordance with said detection of change points so that said range of the code generation rate begins at a picture next to one of said I-pictures and terminates at the next I-picture, and so that, upon detection of a scene change by said change point detection, any residual data previously allocated to said one I-picture in a group of pictures is allocated instead to another of said pictures in said group of pictures.

14. The encoding method as in claim 13; wherein a starting picture and a number of said pictures contained in said range of the code generation rate are fixed.

15. The encoding method as in claim 13; wherein said range of the code generation rate is doubled in case of said detection of a scene change.

16. The encoding method as in claim 13; further comprising the step of inserting in said bitstream information specifying said range of the code generation rate.

17. The encoding method as in claim 13; further comprising overriding said detection of a scene change until said another picture to which said residual data is allocated has been encoded with fixed length encoding.

18. The encoding method as in claim 13; further comprising effecting motion vector detection in connection with inter-frame prediction; and wherein said detecting of change points of said pictures of the input video signal data is based on the amount of said residual data at the time of said motion vector detection in inter-frame prediction.

* * * * *